(12) United States Patent
Ganguli et al.

(10) Patent No.: US 11,362,904 B2
(45) Date of Patent: Jun. 14, 2022

(54) TECHNOLOGIES FOR NETWORK DISCOVERY

(71) Applicant: INTEL CORPORATION, Santa Clara, CA (US)

(72) Inventors: Mrittika Ganguli, Tempe, AZ (US); Dinesh Kumar, Beaverton, OR (US); Robert Valiquette, Saint-Bruno-de-Montarville (CA); Yadong Li, Portland, OR (US); Mohan Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/957,626

(22) PCT Filed: Feb. 21, 2019

(86) PCT No.: PCT/US2019/018978
§ 371 (c)(1),
(2) Date: Jun. 24, 2020

(87) PCT Pub. No.: WO2019/165088
PCT Pub. Date: Aug. 29, 2019

(65) Prior Publication Data
US 2021/0058299 A1    Feb. 25, 2021

Related U.S. Application Data

(60) Provisional application No. 62/633,435, filed on Feb. 21, 2018.

(51) Int. Cl.
*H04L 41/12* (2022.01)
*H04L 12/46* (2006.01)

(52) U.S. Cl.
CPC ............ *H04L 41/12* (2013.01); *H04L 12/465* (2013.01); *H04L 12/4658* (2013.01)

(58) Field of Classification Search
CPC ........ G06F 13/00; H04K 12/24; H04K 12/46; H04K 12/465; H04K 12/4658;
(Continued)

(56) References Cited

U.S. PATENT DOCUMENTS 8,341,271 B2 * 12/2012 Cho ...................... H04L 67/303
709/227
11,095,730 B1 * 8/2021 Chaganti ............... G06F 9/5005
(Continued)

OTHER PUBLICATIONS

International Preliminary Report on Patentability for PCT Patent Application No. PCT/US19/18978, dated Aug. 27, 2020, 10 pages.
(Continued)

*Primary Examiner* — Douglas B Blair
(74) *Attorney, Agent, or Firm* — Compass IP Law, PC

(57) ABSTRACT

Technologies for enhanced network discovery and configuration include a network with a fabric manager and multiple network devices. A network device requests platform information from a management controller and receives the platform information via a sideband interface. The network device broadcasts a discovery message indicative of the platform information on a link layer network. The fabric manager discovers the network topology with an enhanced link layer discovery protocol and creates a vPOD in the network. The vPOD includes an application network with multiple racks. The fabric manager creates a tagged network domain for the vPOD. The fabric manager sends an out-of-band configuration command to the network device with a tag associated with the vPOD. After receiving the out-of-band configuration command, the network device receives a packet, compares domain metadata of the packet to the tag
(Continued)

received from the fabric manager, and routes the packet. Other embodiments are described and claimed.

21 Claims, 21 Drawing Sheets

(58) Field of Classification Search
CPC ........ H04K 41/12; H04K 43/08; H04K 45/00; H04K 45/02; H04K 45/04; H04K 67/00; H04K 67/02; H04W 84/18; Y02D 30/00
USPC ........................................................ 370/254
See application file for complete search history.

(56) References Cited

U.S. PATENT DOCUMENTS

| | | |
|---|---|---|
| 2013/0089089 A1 | 4/2013 | Kamath et al. |
| 2013/0170490 A1 | 7/2013 | Kreeger et al. |
| 2014/0075179 A1 | 3/2014 | Krishnapura et al. |
| 2014/0282413 A1 | 9/2014 | Grimme et al. |
| 2016/0011900 A1 | 1/2016 | Reddy et al. |
| 2016/0234095 A1* | 8/2016 | Shetty ................. H04L 45/02 |
| 2021/0034550 A1* | 2/2021 | Kuzmack .............. G06F 13/122 |

OTHER PUBLICATIONS

PCT Search Report and Written Opinion prepared for PCT/US2019/018978, completed May 28, 2019.

* cited by examiner

TECHNOLOGIES FOR NETWORK DISCOVERY

CROSS-REFERENCE TO RELATED APPLICATION

The present application is a national stage entry under 35 USC § 371 (b) of International Application No. PCT/US2019/018978, filed Feb. 21, 2019, which claims the benefit of U.S. Provisional Patent Application No. 62/633,435, filed Feb. 21, 2018.

BACKGROUND

A pod may be a physical collection of multiple racks. Application networks or virtual pods (vPODs) carved out of layer three (L3) infrastructure networks may be provided to isolate customer networks for specific usages. Typical vPODs are manually configured in-band.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
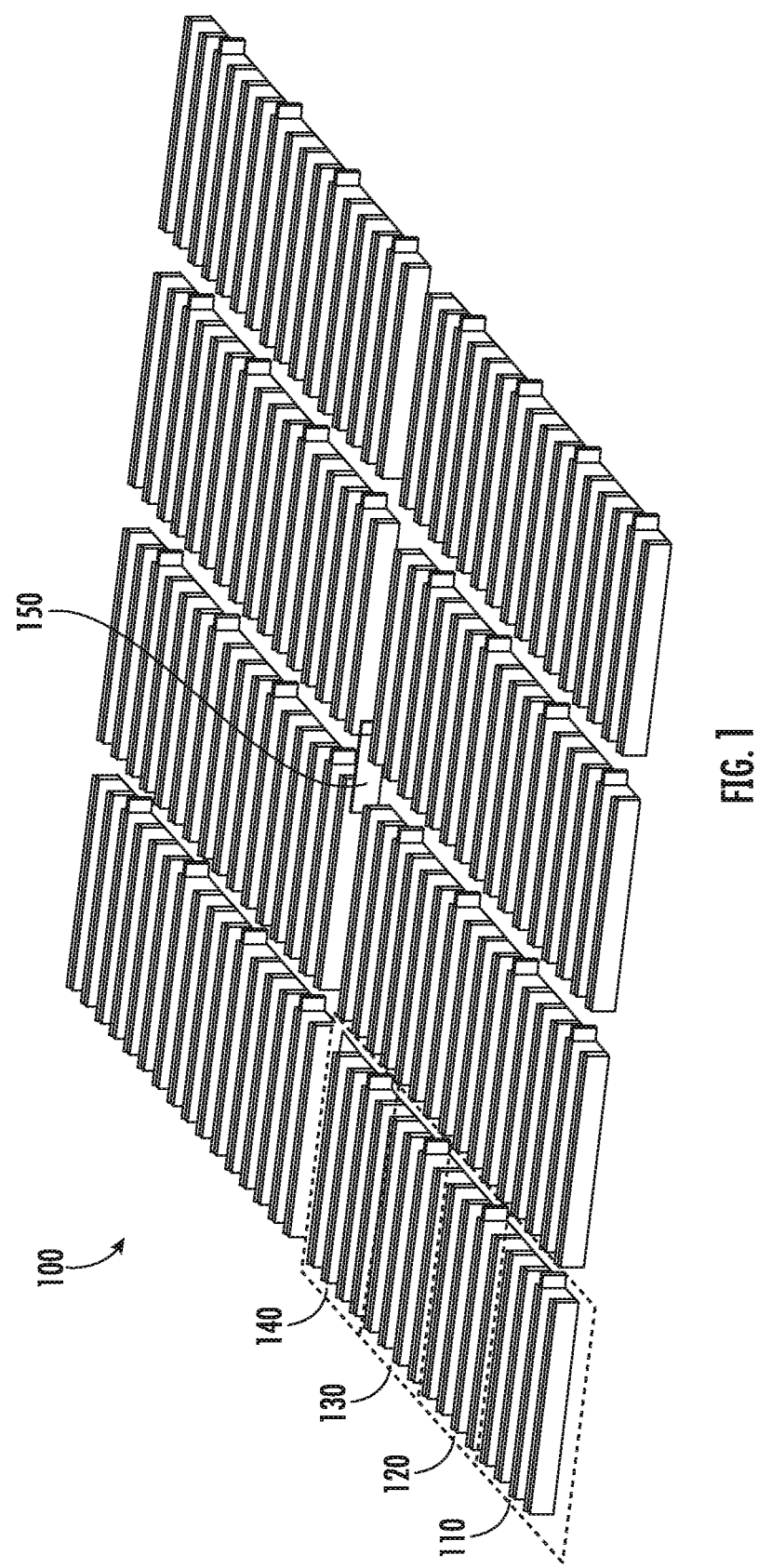
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. As described in more detail herein, each rack houses multiple sleds, which each may be embodied as a compute device, such as a server, that is primarily equipped with a particular type of resource (e.g., memory devices, data storage devices, accelerator devices, general purpose processors). In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. As described in more detail herein, resources within sleds in the data center 100 may be allocated to a group (referred to herein as a "managed node") containing resources from one or more other sleds to be collectively utilized in the execution of a workload. The workload can execute as if the resources belonging to the managed node were located on the same sled. The resources in a managed node may even belong to sleds belonging to different racks, and even to different pods 110, 120, 130, 140. Some resources of a single sled may be allocated to one managed node while other resources of the same sled are allocated to a different managed node (e.g., one processor assigned to one managed node and another processor of the same sled assigned to a different managed node). By disaggregating resources to sleds comprised predominantly of a single type of resource (e.g., compute sleds comprising primarily compute resources, memory sleds containing primarily memory resources), and selectively allocating and deallocating the disaggregated resources to form a managed node assigned to execute a workload, the data center 100 provides more efficient resource usage over typical data centers comprised of hyperconverged servers containing compute, memory, storage and perhaps additional resources). As such, the data center 100 may provide greater performance (e.g., throughput, operations per second, latency, etc.) than a typical data center that has the same number of resources.

Figure 2:
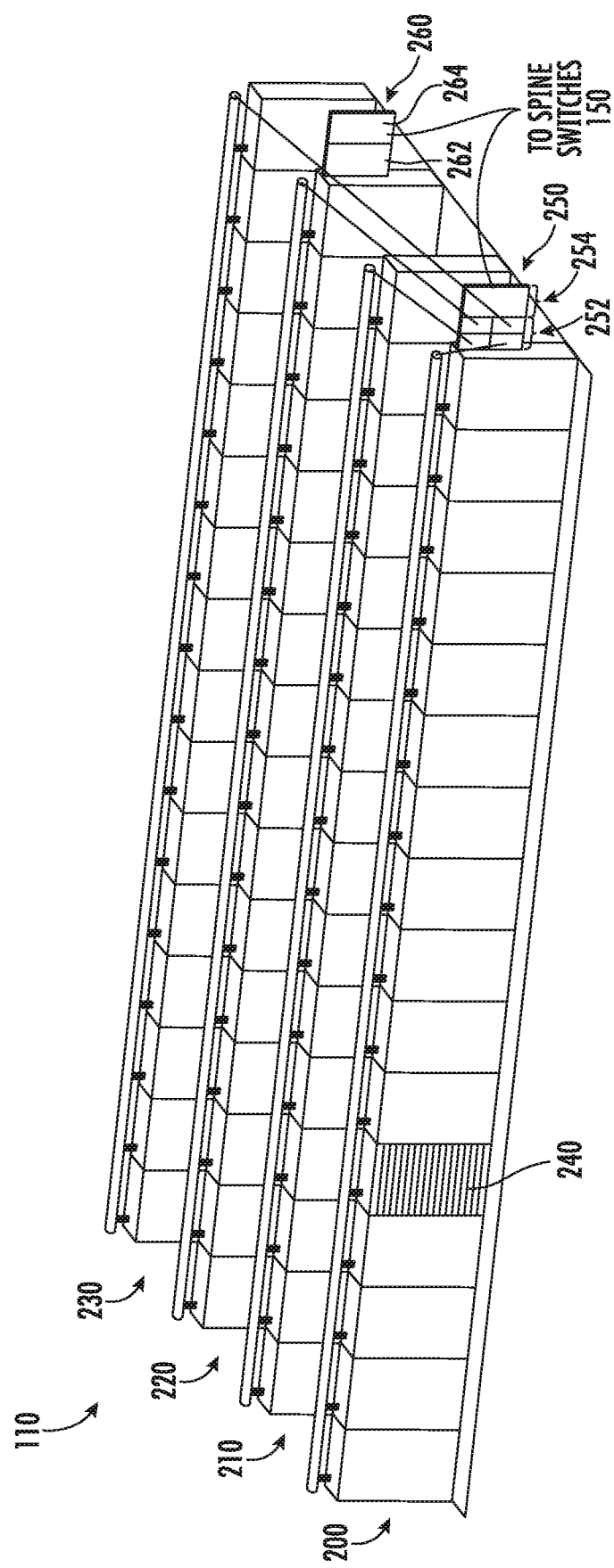
FIG. 2 is a simplified diagram of at least one embodiment of a pod of the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, Infiniband) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to different number of pod switches (e.g., providing even more failover capacity).

Figure 3:
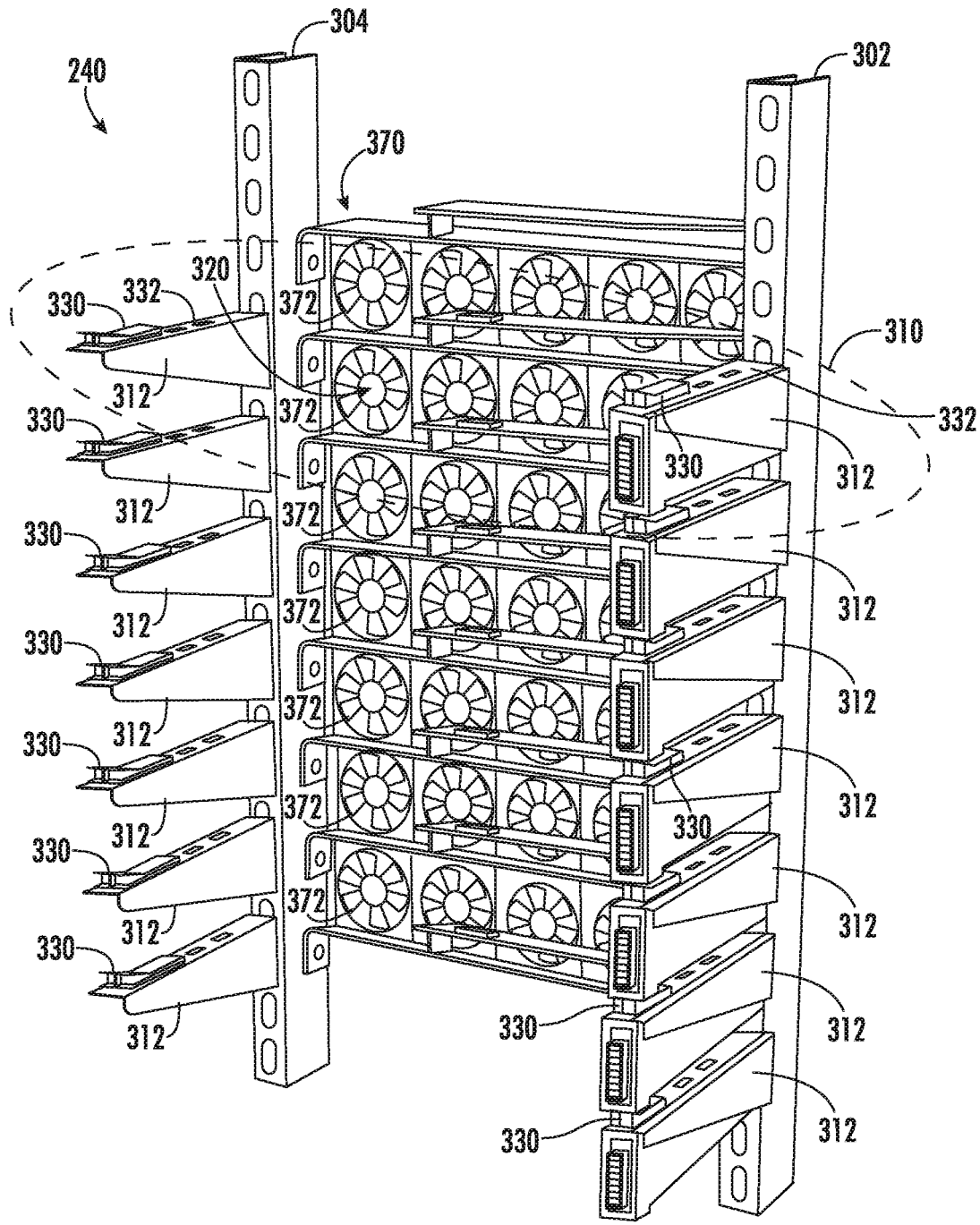
FIG. 3 is a perspective view of at least one embodiment of a rack that may be included in the pod of FIG. 2.
Figure 4:
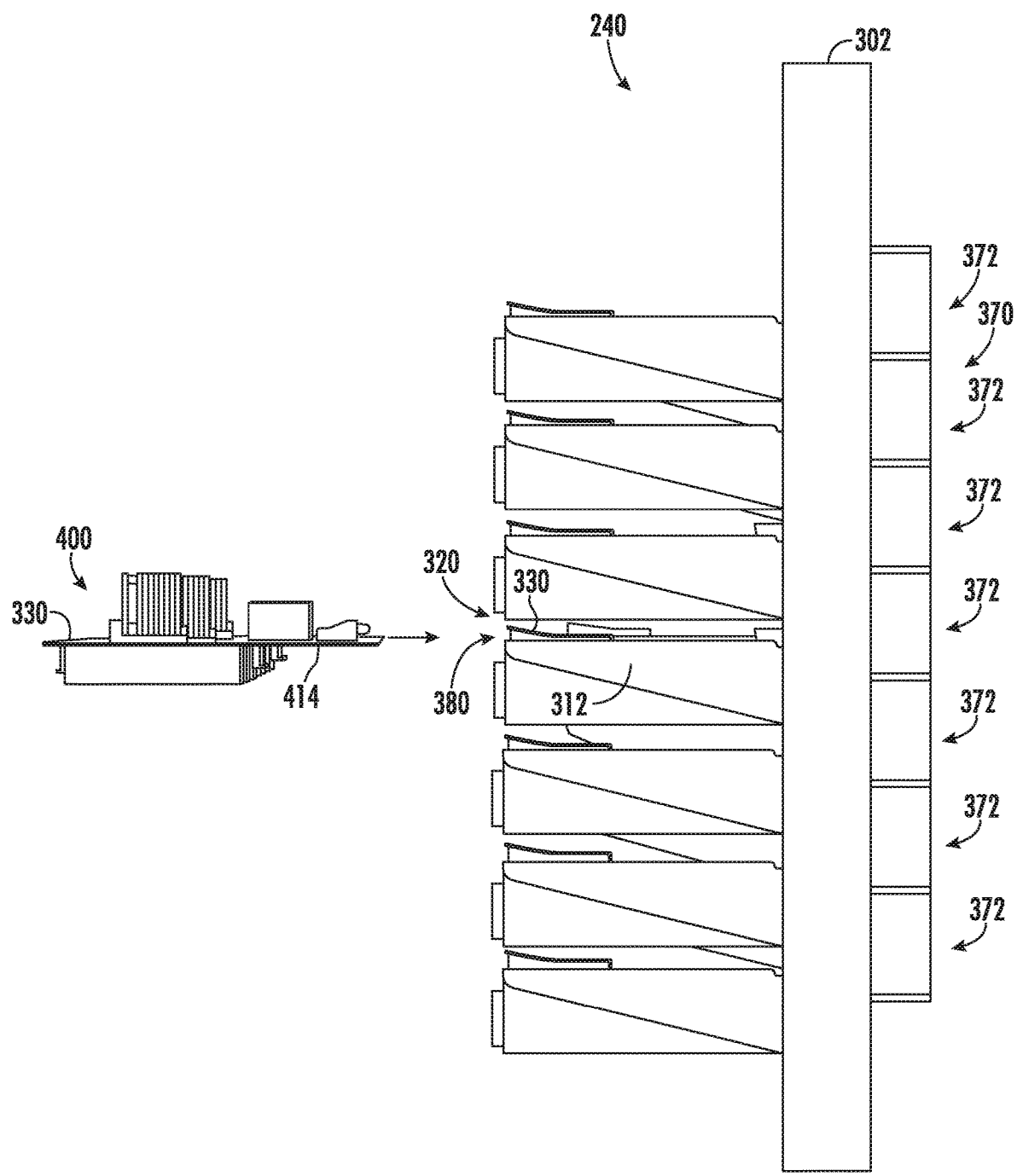
FIG. 4 is a side plan elevation view of the rack of FIG. 3.
Figure 5:
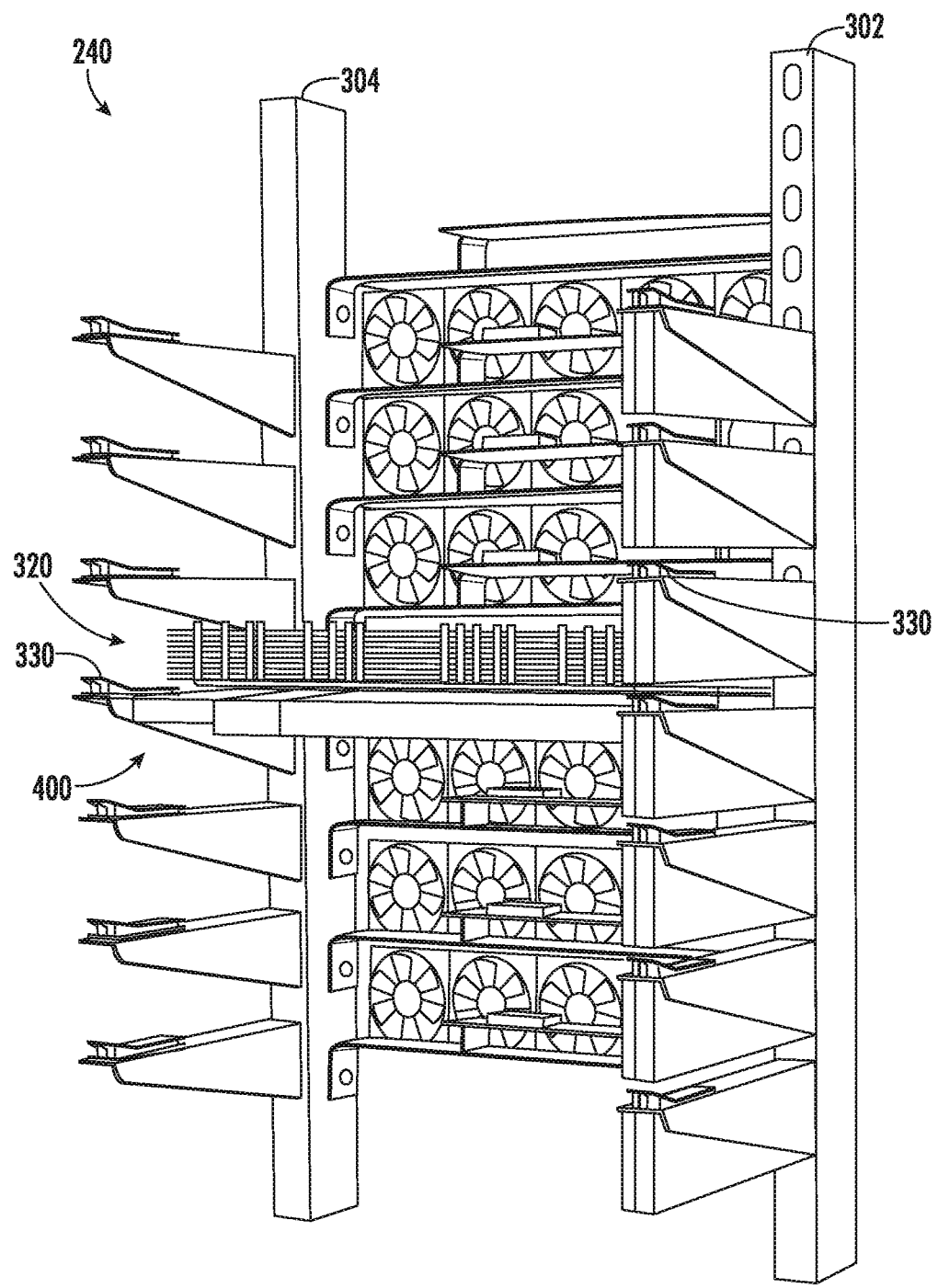
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1 U"). That is, the vertical distance between each pair 310 of elongated support arms 312 may be less than a standard rack unit "1 U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which the interconnect may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable enters the connector mechanism. Subsequently, the optical fiber inside the cable enters a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240.

Figure 6:
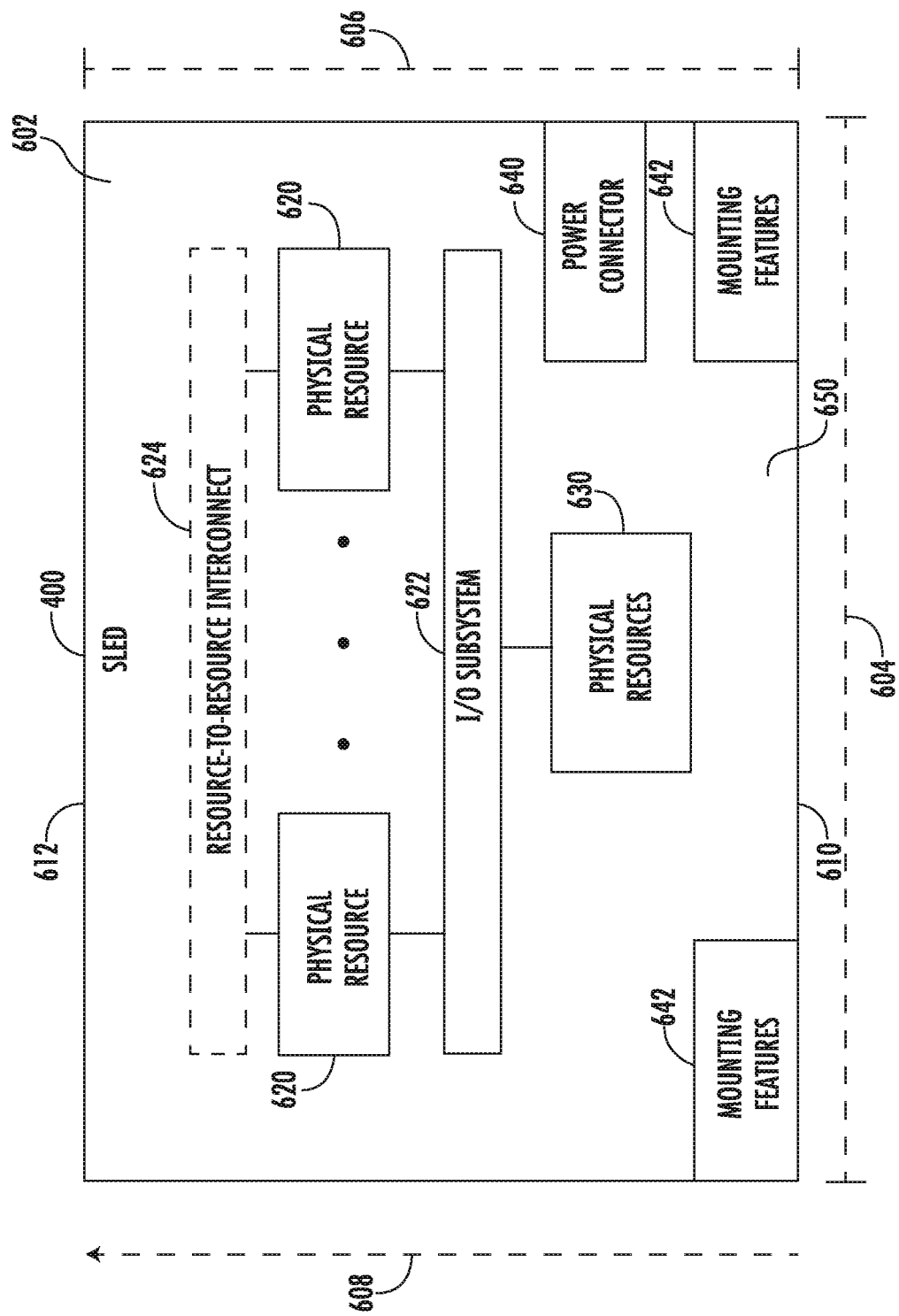
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no backplane (e.g., a backplate of the chassis) to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, power is provided to the processors 820 through vias directly under the processors 820 (e.g., through the bottom side 750 of the chassis-less circuit board substrate 602), providing an increased thermal budget, additional current and/or voltage, and better voltage control over typical boards.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
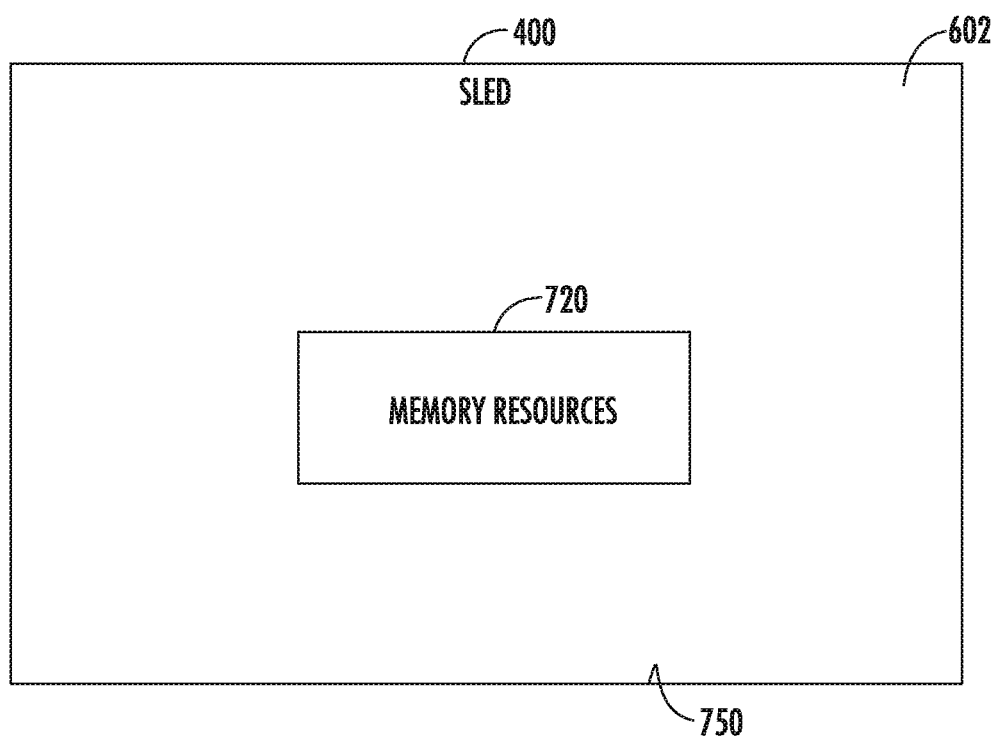
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory devices 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
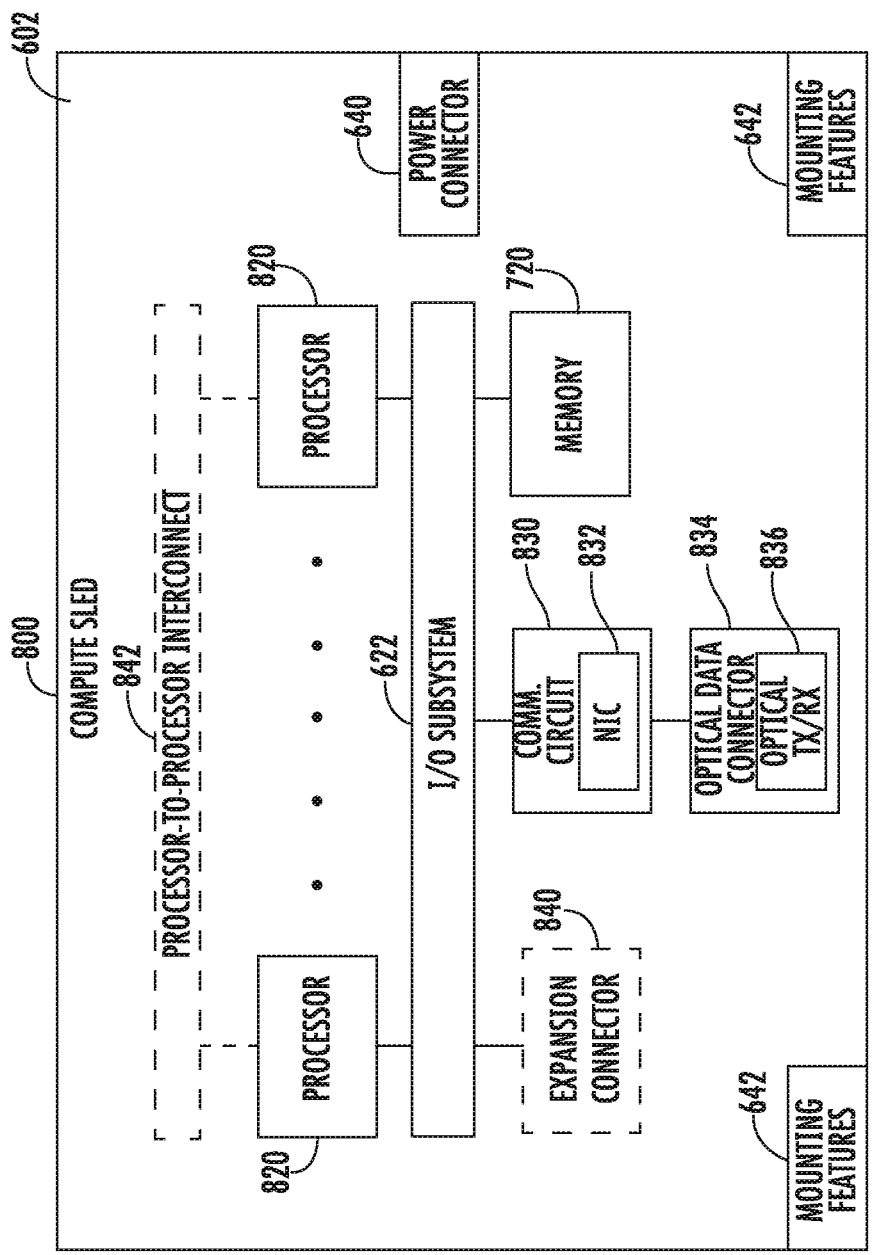
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
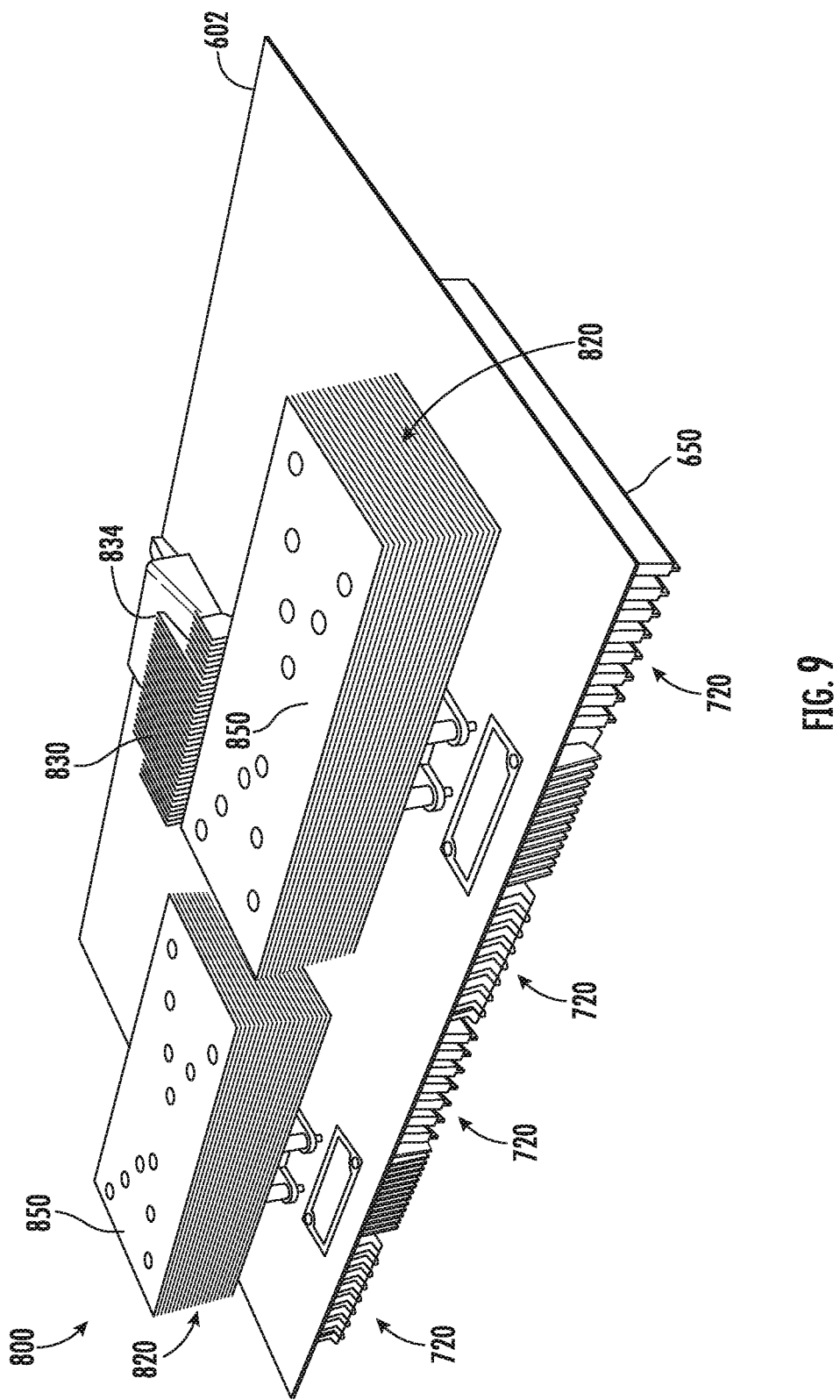
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsinks.

Figure 10:
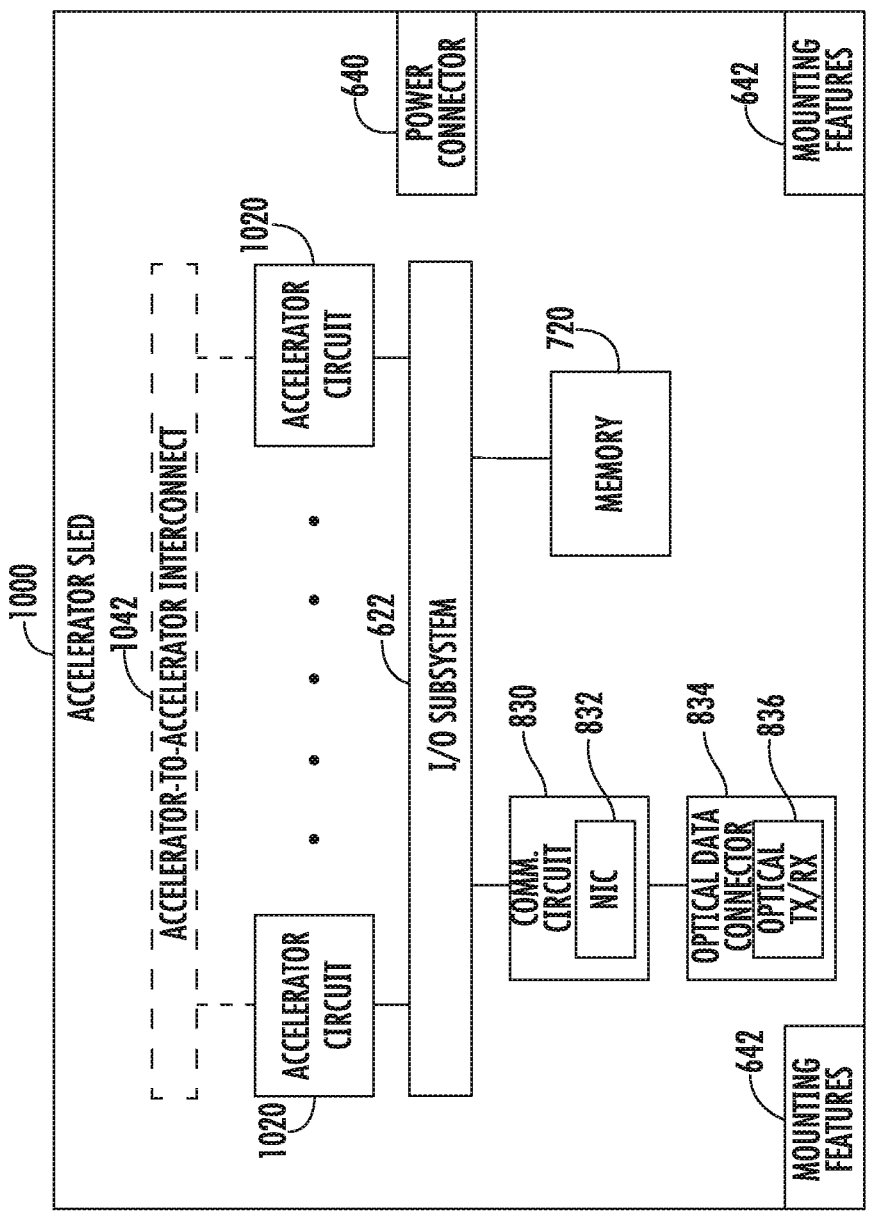
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is optimized, or otherwise configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
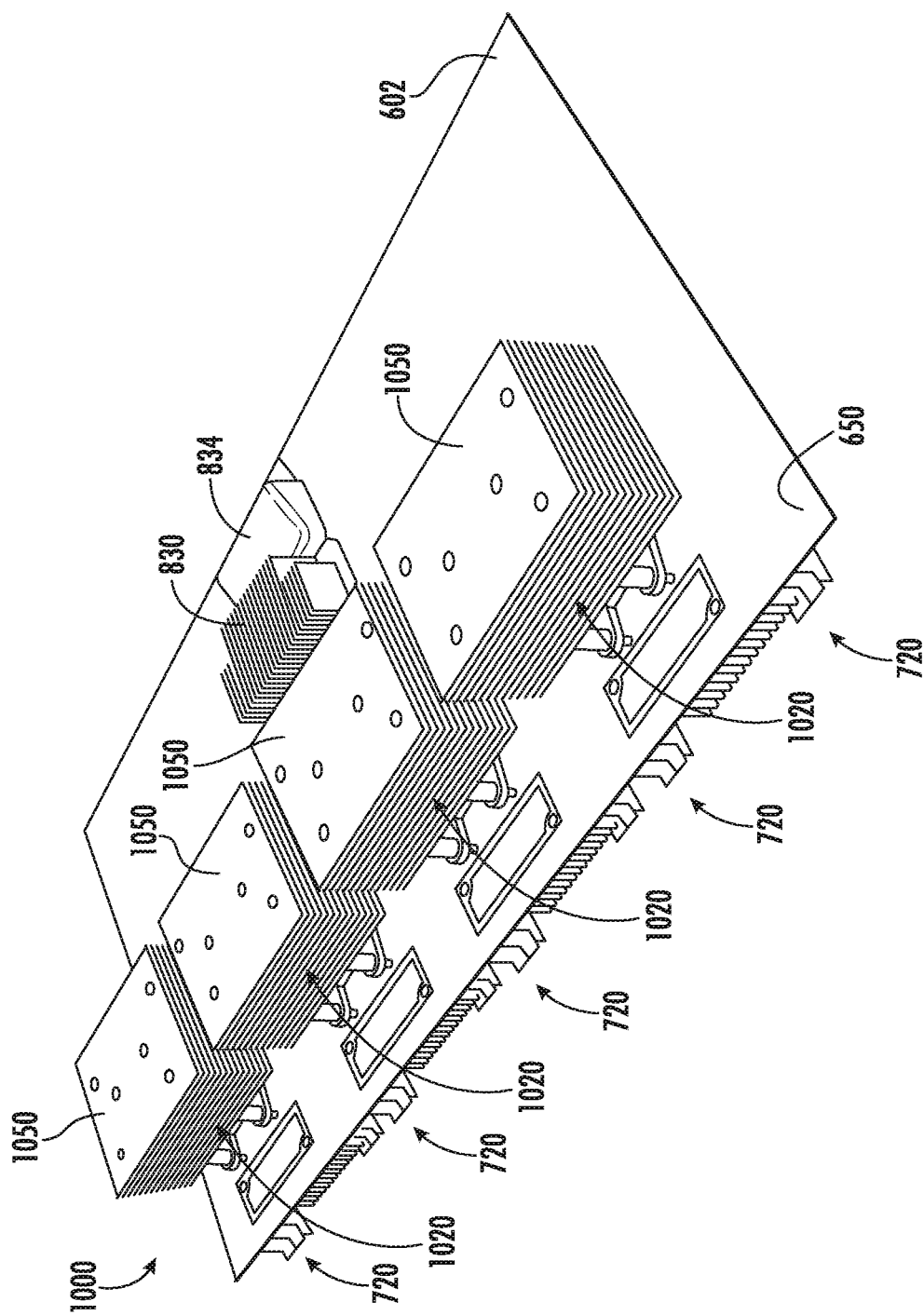
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), machine learning circuits, or other specialized processors, controllers, devices, and/or circuits.

In some embodiments, the accelerator sled 1000 may also include an accelerator-to-accelerator interconnect 1042.

Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than tradition heatsinks because of the "free" area provided by the memory devices 750 being located on the bottom side 750 of the chassis-less circuit board substrate 602 rather than on the top side 650.

Figure 12:
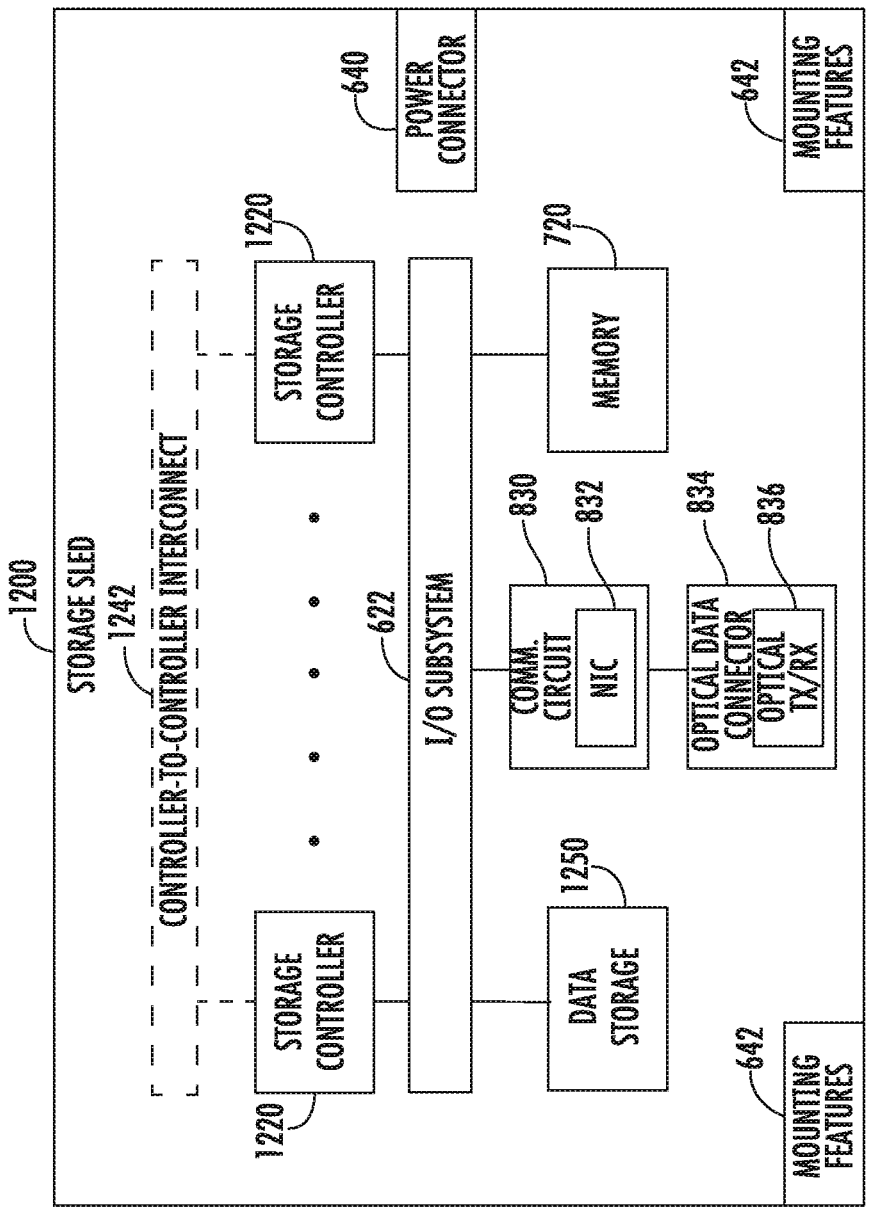
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is optimized, or otherwise configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
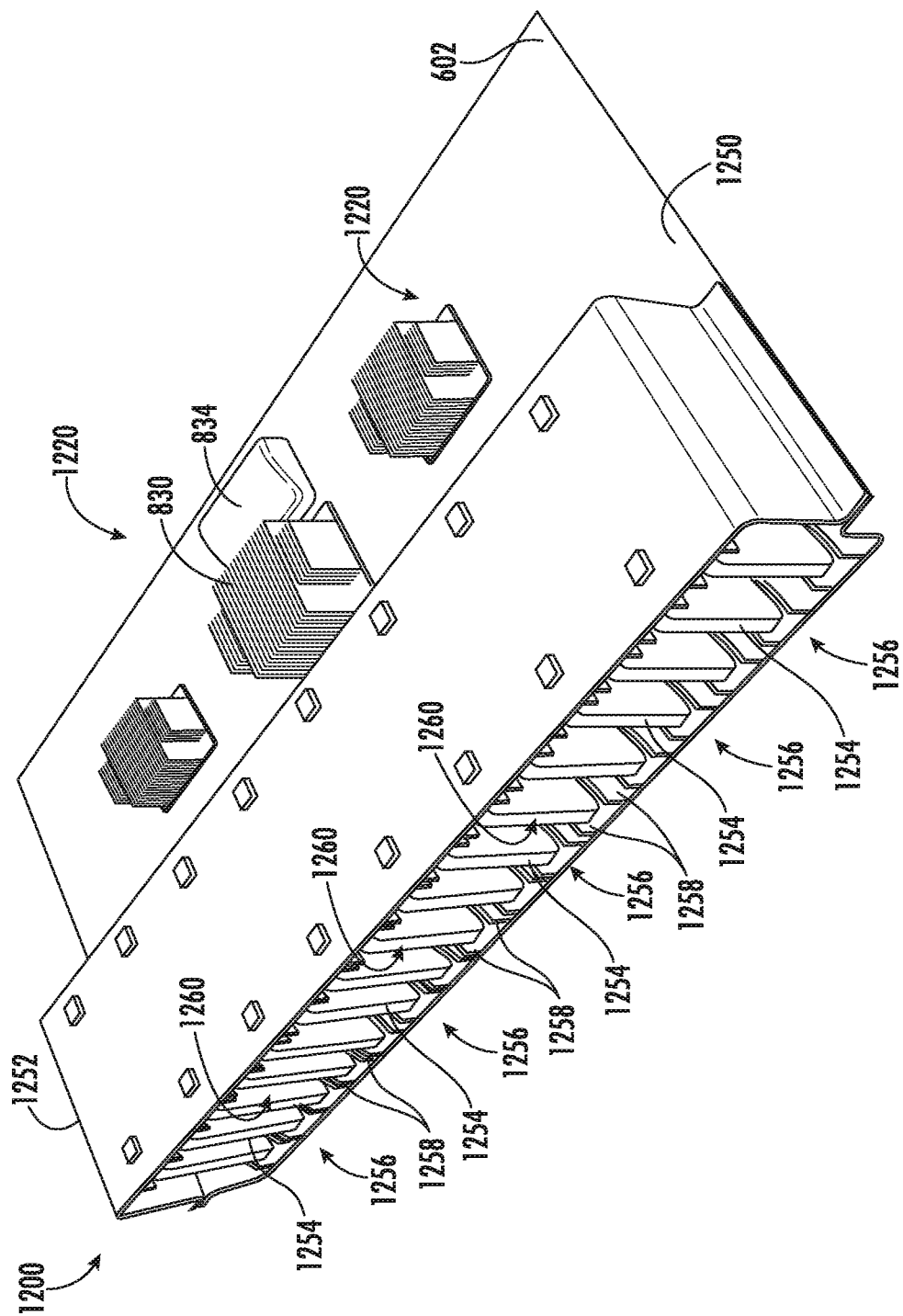
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
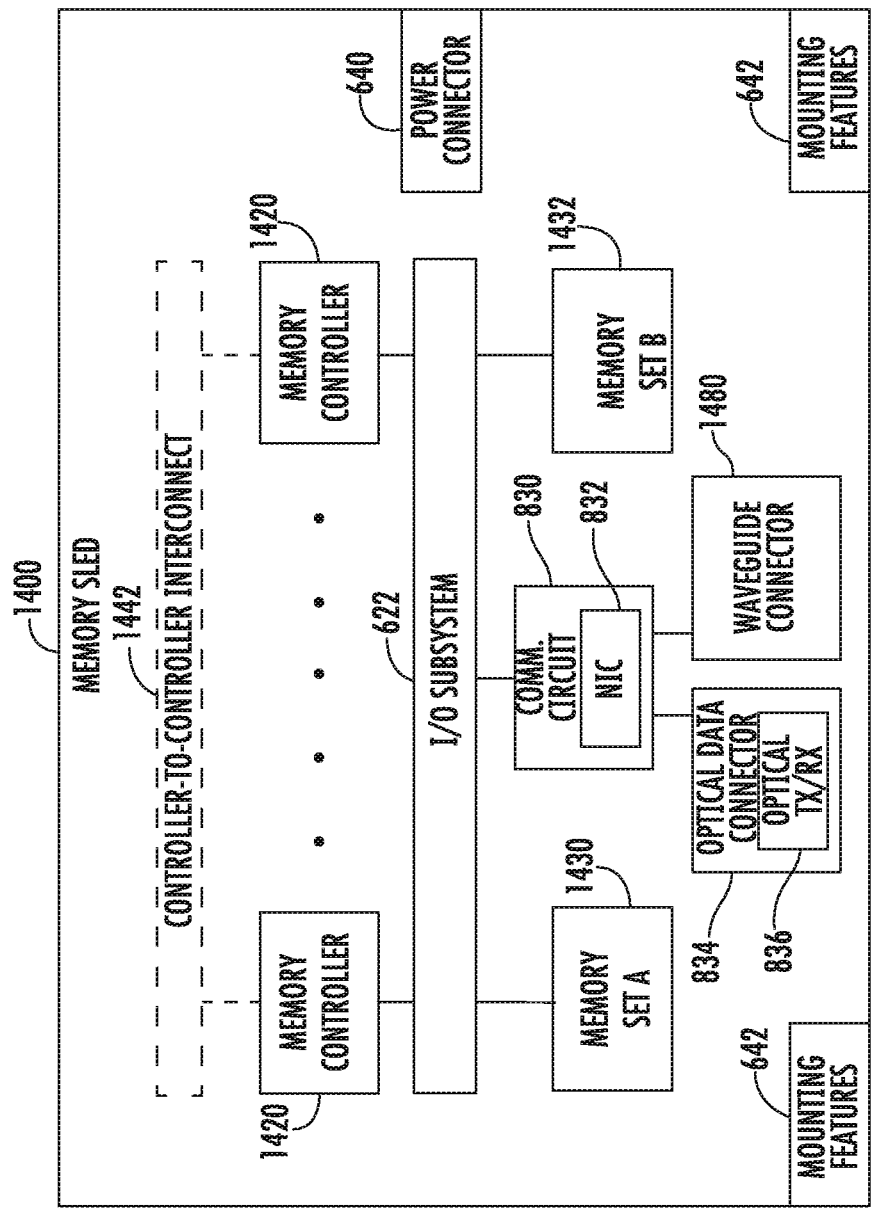
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each storage controller 1220 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Rt (i.e., transmit) lanes. Each lane, in the illustrative embodiment, is either 16 Ghz or 32 Ghz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
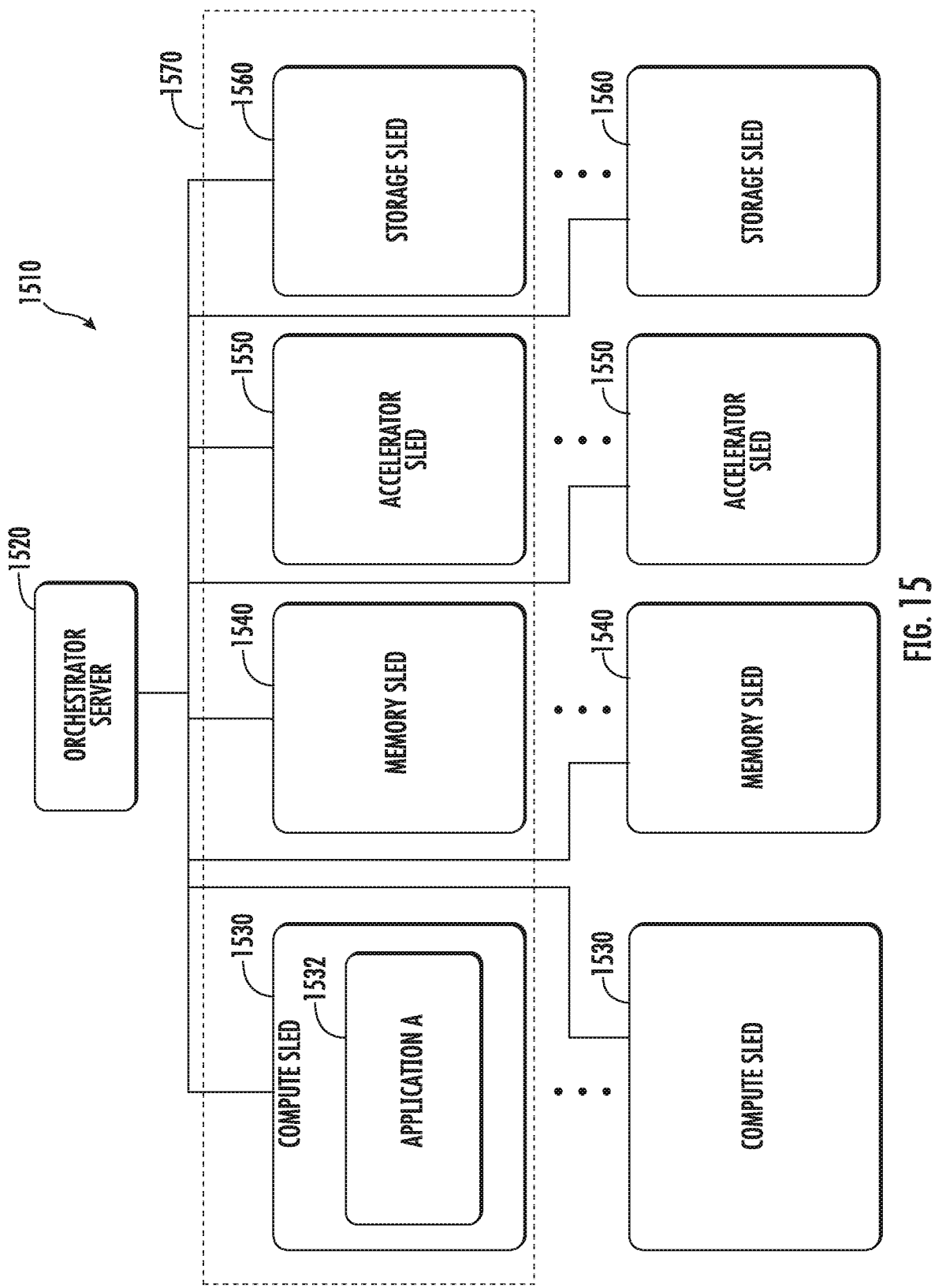
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. If the so, the orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
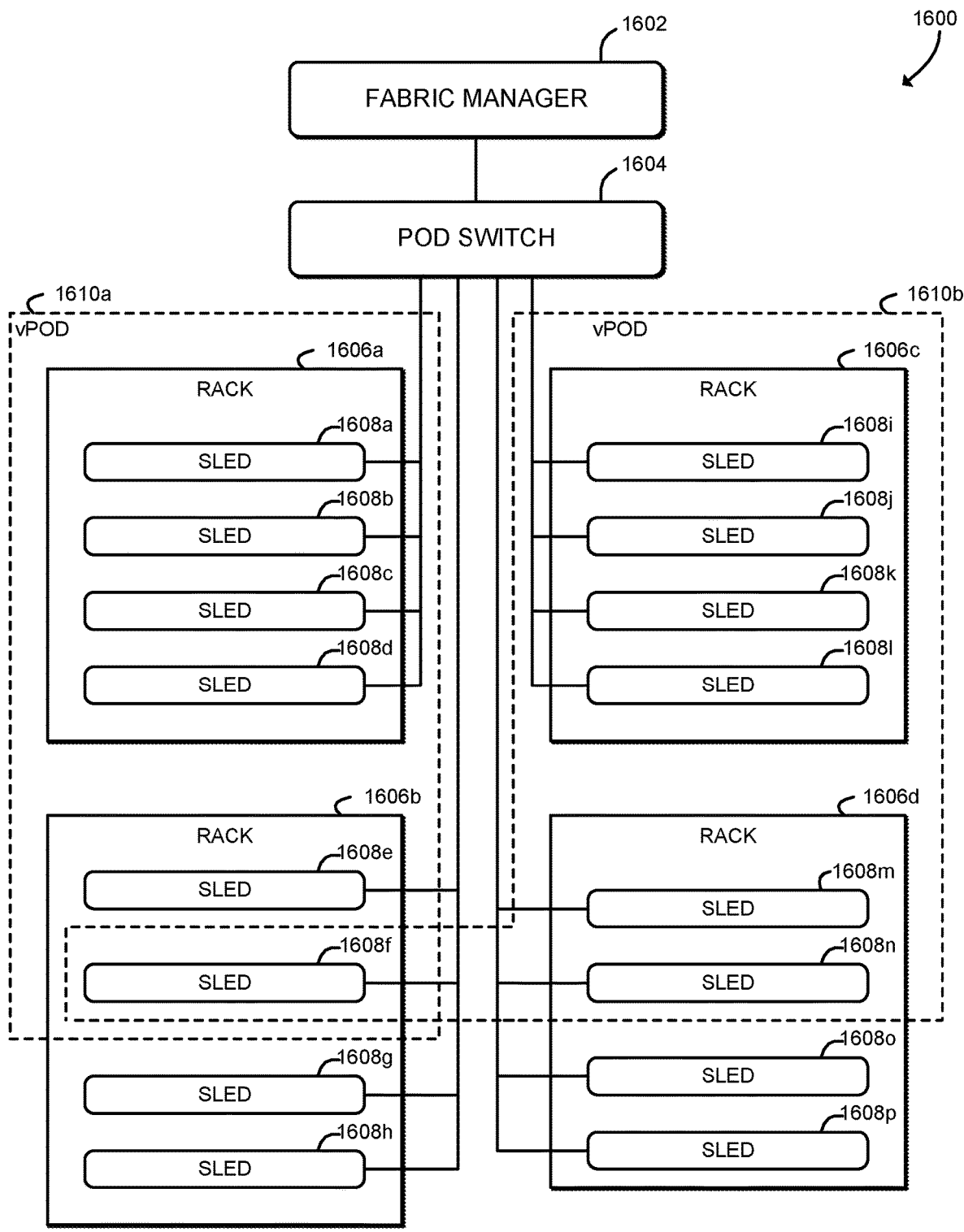
FIG. 16 is a simplified block diagram of at least one embodiment of a system for enhanced network discovery and vPOD management.

Referring now to FIG. 16, a system 1600 for enhanced network discovery and vPOD management includes a fabric manager 1602, a pod switch 1604, and multiple racks 1606. Each rack includes multiple sleds 1608, as shown. As discussed further below, in use, the fabric manager 1602 discovers the end-point capabilities of a topology under the pod switch 1604 (including items such as network interface controller (NIC) configuration features) out-of-band using an enhanced link layer discover protocol (LLDP) capability type-length-value (TLV). Based on the topoplogy, the fabric manager 1602 may configure multiple application networks or vPODs 1610 using out-of-band configuration. Each vPOD 1610 may include sleds 1608 and other network devices (e.g., top-of-rack switches or other switches) from multiple racks 1606. In some embodiments, one or more sleds 1608 (e.g., storage sleds) may be shared between vPODs 1610. For example, in the illustrative system 1600 the sled 1608f is shared by both the vPOD 1610a and the vPOD 1610b.

As described above, the POD network topologies under a data center POD switch 1604 may include multiple racks 1606. Application networks or vPODs 1610 carved out of L3 infrastructure networks are provided to isolate customer networks for specific usages. Requirements for such infrastructure networks may include: Mechanisms to identify and isolate physical networks at the POD switch involving IP and mac address based cluster of systems; L3 services like DHCP (IP address re-use) routing, interface, tunneling NATing, IP forwarding; SDN controller per isolated network; Virtual security domains for micro-segmentation (e.g., ACLs and firewalls); VXLANs and distributed switch functionality (e.g., NXP) functionality; and Inline data plane security between domains. Accordingly, the system 1600 may improve on existing systems by being automated and scalable, and allowing out-of-band configuration. The system 1600 may allow cloud scheduling and control from one location. The system 1600 may require a reduced number of control mechanisms. The system 1600 may not re-use the storage zones concept.

The illustrative fabric manager 1602 may be embodied as an orchestrator server 1520, a compute sled 800, or other managed node of the data center 100. Similarly, the POD switch 1604 may be embodied as a pod switch 250, 260, end-of-row switch, or other switch of the data center 100. Each of the sleds 1608 may be embodied as a sled 400, a compute sled 800, an accelerator sled 1000, a storage sled 1200, a memory sled 1400, or other sled of the data center 100.

Figure 17:
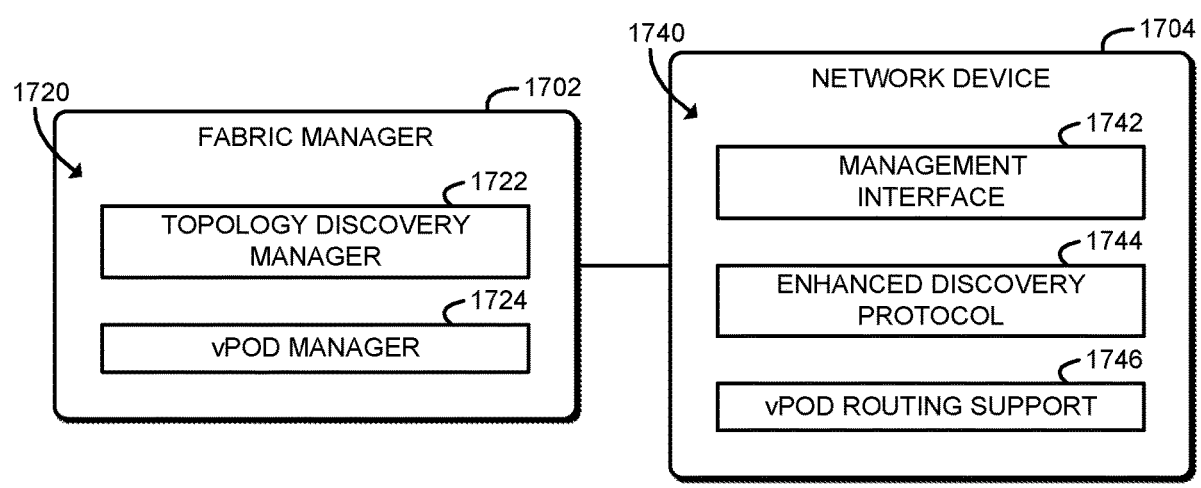
FIG. 17 is a simplified block diagram of at least one embodiment of various environments of the system of FIG. 16.

Referring now to FIG. 17, a fabric manager 1702 (e.g., the fabric manager 1602) establishes an environment 1720 during operation. The illustrative environment 1720 includes a topology discovery manager 1722 and a vPOD manager 1724. The various components of the environment 1720 may be embodied as hardware, firmware, software, or a combination thereof. As such, in some embodiments, one or more of the components of the environment 1720 may be embodied as circuitry or collection of electrical devices (e.g., topology discovery manager circuitry 1722 and/or vPOD manager circuitry 1724). It should be appreciated that, in such embodiments, one or more of the topology discovery manager circuitry 1722 and/or the vPOD manager circuitry 1724 may form a portion of a processor, an I/O subsystem, an accelerator, a NIC, and/or other components of the fabric manager 1702. Additionally, in some embodiments, one or more of the illustrative components may form a portion of another component and/or one or more of the illustrative components may be independent of one another.

The topology discovery manager 1722 is configured to discover a network topology of a network using an enhanced link layer discovery protocol (LLDP). Discovering the network topology may include sending one or more out-of-band requests to the pod switch 1604 of the network.

The vPOD manager 1724 is configured to create a vPOD 1610 in the network in response to discovering the network topology. The vPOD 1610 is an application network that includes more than one rack 1606 in the network. As described above, each rack 1606 includes multiple network devices 1704, such as sleds 1608, switches, and other network devices. The vPOD manager 1724 is further configured to create a tagged network domain for the vPOD 1610 in response to creating the vPOD 160. The vPOD manager 1724 may send out-of-band configuration commands to the network devices 1704. Each out-of-band configuration command may be indicative of a tag associated with the tagged network domain. The vPOD manager 1724 may be further configured to maintain mappings of vPODs to S-tags. The vPOD manager 1724 may be further configured to expose a vPOD creation application programming interface (API).

Still referring to FIG. 17, network device 1704 (e.g., a sled 1608, a NIC of a sled 1608, a top-of-rack switch, a middle-of-rack switch, a switch, or other network device) establishes an environment 1740 during operation. The illustrative environment 1740 includes a management interface 1742, an enhanced discovery protocol 1744, and vPOD routing support 1746. The various components of the environment 1740 may be embodied as hardware, firmware, software, or a combination thereof. As such, in some embodiments, one or more of the components of the environment 1740 may be embodied as circuitry or collection of electrical devices (e.g., management interface circuitry 1742, enhanced discovery protocol circuitry 1744, and/or vPOD routing support circuitry 1746). It should be appreciated that, in such embodiments, one or more of the management interface circuitry 1742, the enhanced discovery protocol circuitry 1744, and/or the vPOD routing support circuitry 1746 may form a portion of a processor, an I/O subsystem, an accelerator, a NIC, and/or other components of the network device 1704. Additionally, in some embodiments, one or more of the illustrative components may form a portion of another component and/or one or more of the illustrative components may be independent of one another.

The management interface 1742 is configured to request, by a network controller, platform information from a management controller of the network device 1704. The network controller may be embodied as, for example, a NIC of a sled 1608, a flexible packet processing switch (FPPS) or other processor of a switch, or other network controller. The management controller may be embodied as, for example, a board management controller (BMC) of a sled 1608 or a switch management controller (SMC) of a switch. The management interface 1742 is further configured to receive, by the network controller, the platform information via a sideband interface with the management controller. The platform information may include processor capability information, processor quality of service feature information, or network controller information. The management interface 1742 may be further configured to request, by the network controller, host information from an operating system of the network device 1704 and to receive, by the network controller, the host information. The host information is indicative of a vPOD 1610 that includes the network device 1704. The host information may be received via the sideband interface or via a USB host interface. The management interface 1742 may be further configured to receive an out-of-band configuration command from the fabric manager 1702. The out-of-band configuration command is indicative of a tag (e.g., an S-tag) associated with a vPOD 1610.

The enhanced discovery protocol 1744 is configured to broadcast, by the network controller, a discovery message on a link layer network. The discovery message is indicative of the platform information. The discovery message may be embodied as an enhanced TLV structure of an LLDP frame. The enhanced TLV structure is indicative of the platform information. The enhanced discovery protocol 1744 may be further configured to broadcast, by the network controller, another discovery message on the link layer network that is indicative of the host information. That discovery message may be embodied as a network segment TLV structure of an LLDP frame. The network segment TLV structure is indicative of the host information.

The vPOD routing support 1746 is configured to, after being configured out-of-band by the fabric manager 1702, receive a packet, compare vPOD L3 domain metadata of the packet to the tag associated with the vPOD 1610, and route the packet in response to comparing the vPOD L3 domain metadata of the packet to the tag. The packet may include the vPOD tag as well as other tags, such as a VLAN tag, a Vxlan tag, or a tunnel header. The vPOD routing support 1746 may be further configured to isolate network traffic based on the vPOD L3 domain metadata associated with each packet of the network traffic. The vPOD routing support 1746 may be further configured to insert the tag into the packet in response to receiving the packet from outside the vPOD 1610 and to remove the tag from the packet in response to routing the packet outside of the vPOD 1610.

Figure 18:
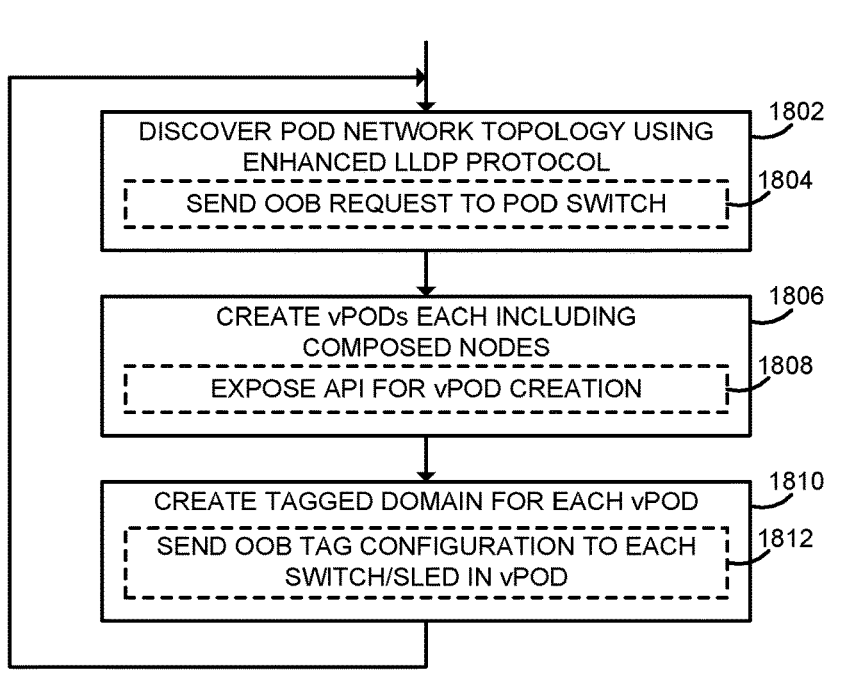
FIG. 18 is a simplified flow diagram of at least one embodiment of a method for enhanced network discovery and vPOD management that may be executed by a fabric manager of FIGS. 16-17.

Referring now to FIG. 18, in use, the fabric manager 1702 may execute a method 1800 for enhanced network discovery and vPOD management. It should be appreciated that, in some embodiments, the operations of the method 1800 may be performed by one or more components of the environment 1720 of the fabric manager 1702 as shown in FIG. 17. The method 1800 begins in block 1802, in which the fabric manager 1702 discovers the POD network topology using an enhanced LLDP protocol. The fabric manager 1702 may, for example, monitor and parse enhanced TLVs transmitted from the network devices 1704 as described further below. In some embodiments, in block 1804 the fabric manager

1702 may send an out-of-band request to the POD switch 1604 to perform the network topology discovery. For example, manager software may execute a topology and capability discovery by an OOB call to the switch management controller (SMC). An LLDP stack request to the NICs may be used, which happens every 30 seconds (configurable) to the control plane, to retrieve data OOB after executing a special LLDP TLV, to discover the topology of connected devices. The fabric manager 1702 may enumerate the network topology including sleds 1608 and POD switches and available paths between servers and switches.

In block 1806, the fabric manager 1702 creates one or more vPODs 1610 including multiple composed nodes. As described above, each vPOD 1610 includes network devices 1704 (e.g., sleds 1608, racks, and/or other network devices) included in multiple racks 1606. In some embodiments, in block 1808 the fabric manager 1702 may expose an API for vPOD 1610 creation. The fabric manager 1702 may provide APIs to create a vPOD 1610 with a desired number of composed nodes and their capacity.

In block 1810, the fabric manager 1702 creates a tagged domain for each vPOD 1610. Nodes are composed as requested, identifying all the physical ports and tunnels on the switch connecting these composed nodes to POD switches. In some embodiments, in block 1812, the fabric manager 1702 may send an out-of-band tag configuration command to each network device 1704 (e.g., switch or sled 1608) of the vPOD 1610. The fabric manager 1702 manages list of available S-TAGS and mapping of S-TAGS to vPODs 1610 present. The fabric manager 1702 may create a port group including all ports belonging to the vPOD 1610 composed nodes by assigning the 802.3ad tag to these ports on switch. All traffic entering to the vPOD switches on the ports on switch is tagged with the 802.3ad tag and isolated to the ports within the groups. The switch will remove the tag when traffic leaves the port group. Broadcast and multicast packets will be contained in the tagged domain, isolating physical networks at the POD switch involving IP and MAC address based cluster of systems. After creating the tagged domains, the method 1800 loops back to block 1802 to continue performing network discovery and vPOD management.

Figure 19:
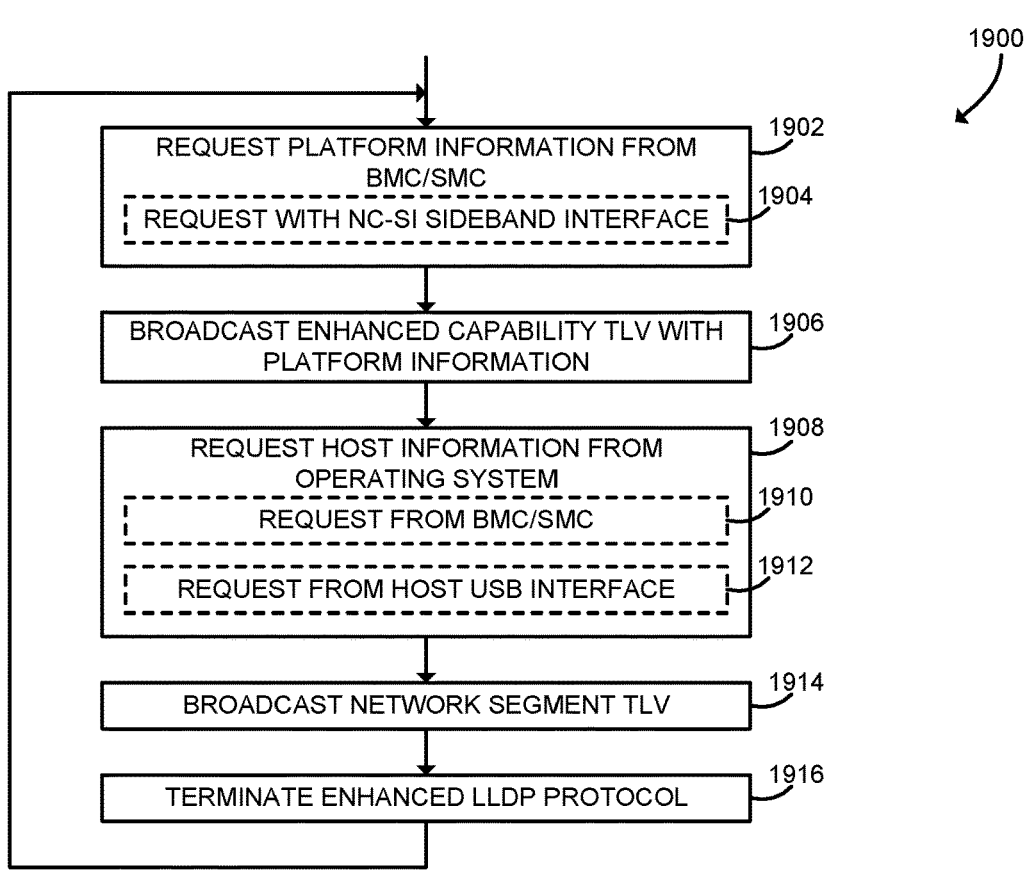
FIG. 19 is a simplified flow diagram of at least one embodiment of a method for enhanced network discovery that may be executed by a network device of FIGS. 16-17.
Figure 20:
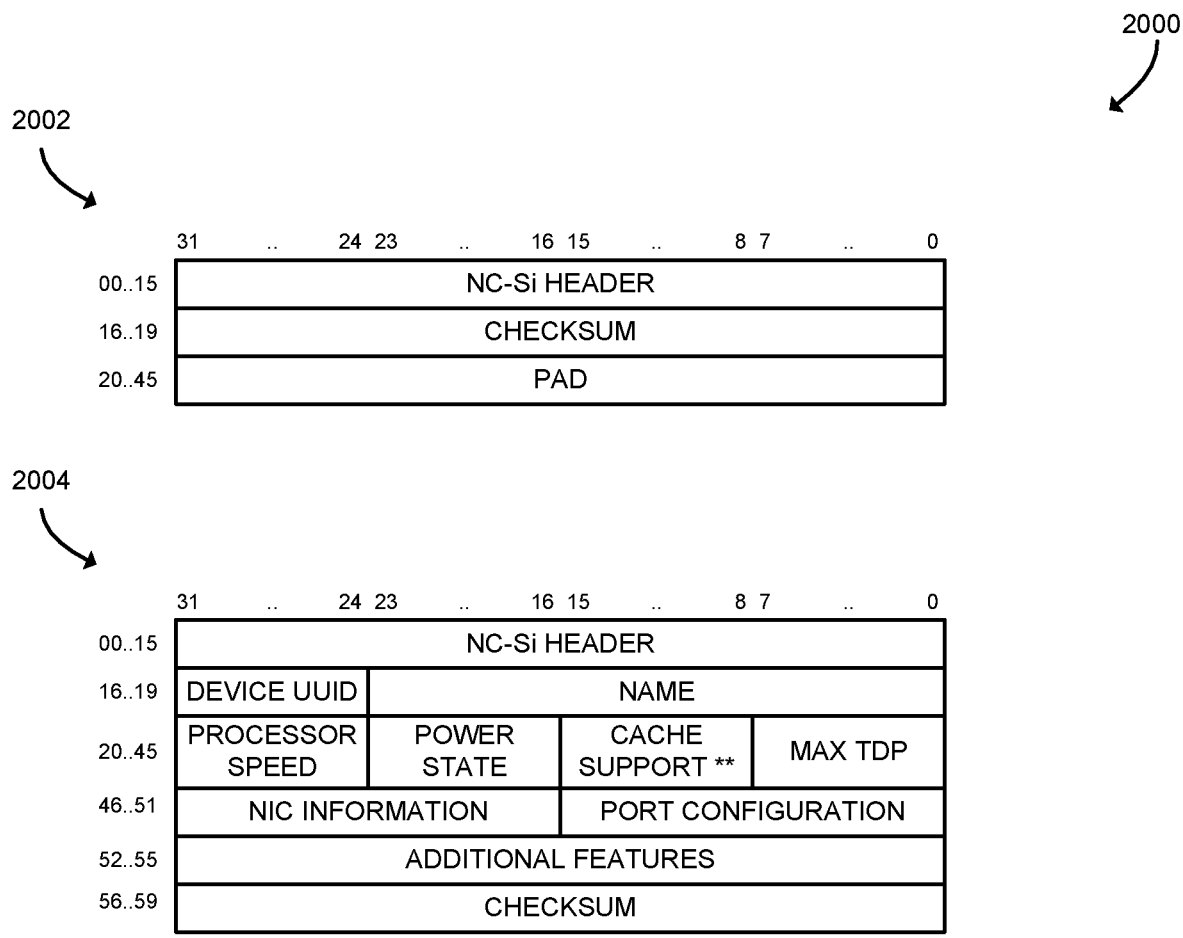
FIG. 20 is a schematic diagram of illustrative sideband interface structures.
Figure 21:
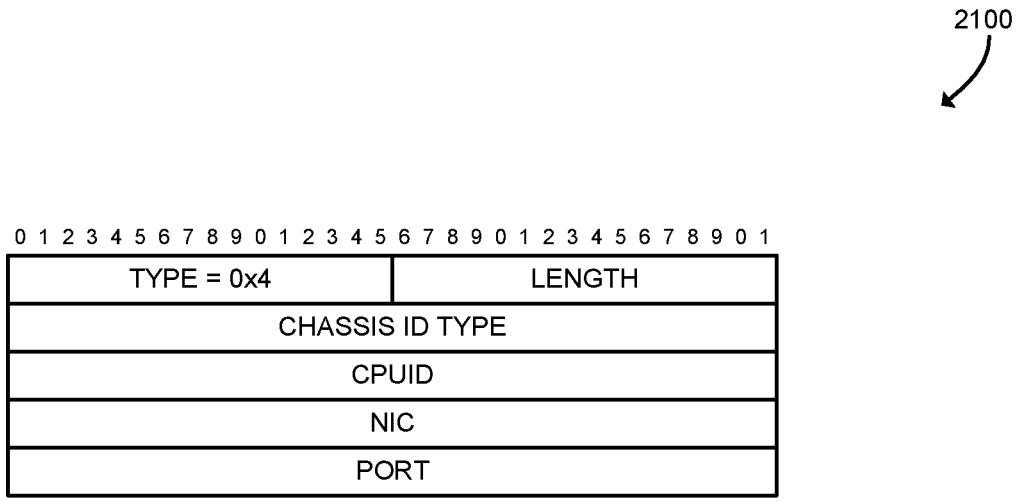
FIG. 21 is a schematic diagram of an illustrative vendor-specific TLV format.

Referring now to FIG. 19, in use, the network device 1704 may execute a method 1900 for enhanced network discovery. It should be appreciated that, in some embodiments, the operations of the method 1900 may be performed by one or more components of the environment 1740 of the network device 1704 as shown in FIG. 17. The method 1900 begins in block 1902, in which the network device 1704 requests platform information for the network device 1704 from a board management controller (BMC), switch management controller (SMC), or other management controller of the network device 1704. The platform information may include, for example, processor information, NIC information, or other endpoint information. In some embodiments, in block 1904 the network device 1704 may send the request via a NC—Si sideband interface between a network controller and the management controller. The management controller provides a response including the platform information. Thus, the system 1600 may create a baseboard management controller (BMC) to NIC infrastructure. One potential embodiment of data structures that may be used to communicate via the sideband interface is shown in FIG. 20 and discussed below. In block 1906, the network device 1704 broadcasts an enhanced capability type-length-value (TLV) structure that includes the platform information. One potential embodiment of an enhanced capability TLV is shown in FIG. 21 and discussed below.

In block 1908, the network device 1704 requests host information from an operating system of the network device 1704. In some embodiments, in block 1910 the network device 1704 may request the host information from the management controller (e.g., via the sideband interface). In some embodiments, in block 1912 the network device 1704 may request the host information via a host USB interface.

In block 1914, the network device 1704 broadcasts a network segment TLV that includes the host information. The network segment TLV may be used to assign domains and tags mapped to switch ports, NIC ports, and software ports and queues. This segment may be discovered via out-of-band management by adding an optional segment TLV and saving the segment TLV with IDs to be used in addition to VxLANs to schedule cloud resources.

Figure 22:
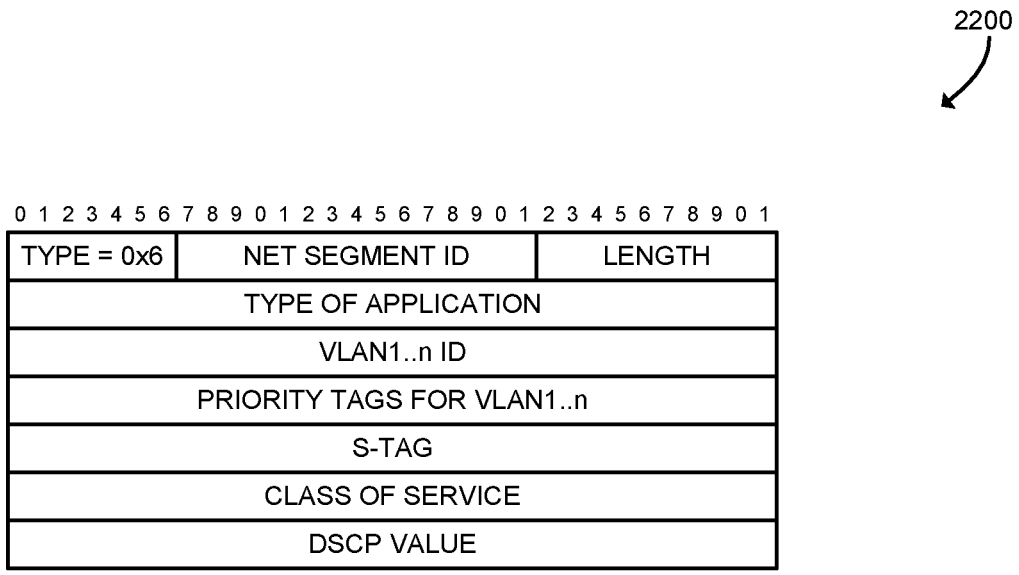
FIG. 22 is a schematic diagram of another illustrative vendor-specific TLV format.

One potential embodiment of the network segment TLV is shown in FIG. 22 and discussed below.

In block 1916, the network device 1704 terminates the enhanced LLDP protocol. For example, the network device 1704 may receive and parse enhanced capability TLVs, network segment TLVs, and other enhanced LLDP TLVs from other network devices 1704. After terminating the protocol, the method 1900 loops back to block 1902 to continue requesting and broadcasting information. The network device 1704 may broadcast enhanced LLDP information periodically (e.g., every 30 seconds) or at other intervals.

Referring now to FIG. 20, diagram 2000 shows an illustrative sideband request 2002 and sideband response 2004 for a NIC sideband (NC—Si) interface. As described above, the NIC firmware may terminate the LLDP enhanced discovery protocol, including the TLV definition as described above. The NIC firmware may obtain platform info from the switch management controller (SMC) via the NC—Si, using specialized NC—Si commands on both ends (i.e., the NIC and the SMC). The NIC firmware may obtain host information from an operating system (OS) (e.g., via SMC as well as via a host USB interface under definition). The SMC and NIC may use a specialized NC—Si Command structure and request/response for retrieving data from the SMC to the NIC.

As shown, the diagram 2000 shows a NIC sideband command structure request 2002. The command structure request 2002, for example, may be identified as GET EndPointDeviceCapability::Request. The request 2002 may include multiple 32-bit words arranged into fields. As shown, the request 2002 may include an NC—Si header in bytes 0 to 15, a checksum in bytes 16 to 19, and padding in bytes 20 to 45.

Similarly, diagram 2000 shows a NIC sideband command structure response 2004. The command structure response 2004, for example, may be identified as GET EndPointDeviceCapability::Response. The response 2004 may include multiple 32-bit words arranged into fields. The response 2004 may include an NC—Si header in bytes 0 to 15, a device UUID and name in bytes 16 to 19, processor speed information (e.g., normal speed, reduced speed, turbo), processor power state, cache support, max TDP, and other processor information in bytes 20 to 45, NIC information and port configuration in bytes 46 to 51, additional features in bytes 52 to 55, and a checksum in bytes 56 to 59.

Referring now to FIG. 21, diagram 2100 shows an illustrative enhanced capability TLV. As shown, the capability TLV may indicate CPU information, NIC information, port information, or other endpoint capabilities of the network device 1704. For example, capability information from CPUID (e.g., from executing the CPUID instruction) may be included as 10 bits. Bits 7:4 may include processor model information, bits 11:8 may include processor family information, and bits 13:12 may include processor type information.

The enhanced TLV may include information on CPU processor quality of service (PQoS) features. For example, the enhanced TLF may include information on the availability of Intel® Resource Director Technology (RDT) features such as Cache Monitoring Technology (CMT), Memory Bandwidth Monitoring (MBW), Cache Allocation Technology (CAT), Code and Data Prioritization (CDP), Memory Bandwidth Allocation (MBA), and I/O. For example, the TLV may include 8 bits to represent which combination of PQoS features are supported.

The NIC information may include 10 bits. The NIC information may represent model, family, or type of the NIC; ports per physical function (PF) of the NIC; modes of the NIC, such as mode-multi-home, multi-node, NIC modes; or affinity information, e.g., whether the NIC is affinitized to CPU (NUMA mode) or free (2 bits). If affinitized to a CPU, then the NIC information may include mapping data (8 bits).

The enhanced TLV may include field-programmable gate array (FPGA) or other end-point data: e.g., information on endpoint capabilities such as NVMe SSD, 3D XPoint DIMM, etc.

The enhanced TLV may include port information, such as port traffic type information (e.g., remote direct memory access (RDMA) and non, (2 bits)). RDMA may be further divided into 4 types (e.g., storage, NVMe, FPGA, other) (2 bits), for a total of 4 bits. The port information may also include port congestion models supported (optional).

Referring now to FIG. 22, diagram 2200 shows an illustrative network segment TLV. As described above, the network segment TLV may assign domains and tags to switch ports, NIC ports, and software ports and queues. The illustrative network segment TLV includes a type of application, one or more vLAN IDs and aassociated priority tags, an S-tag, a class of service, and a DSCP value.

Figure 23:
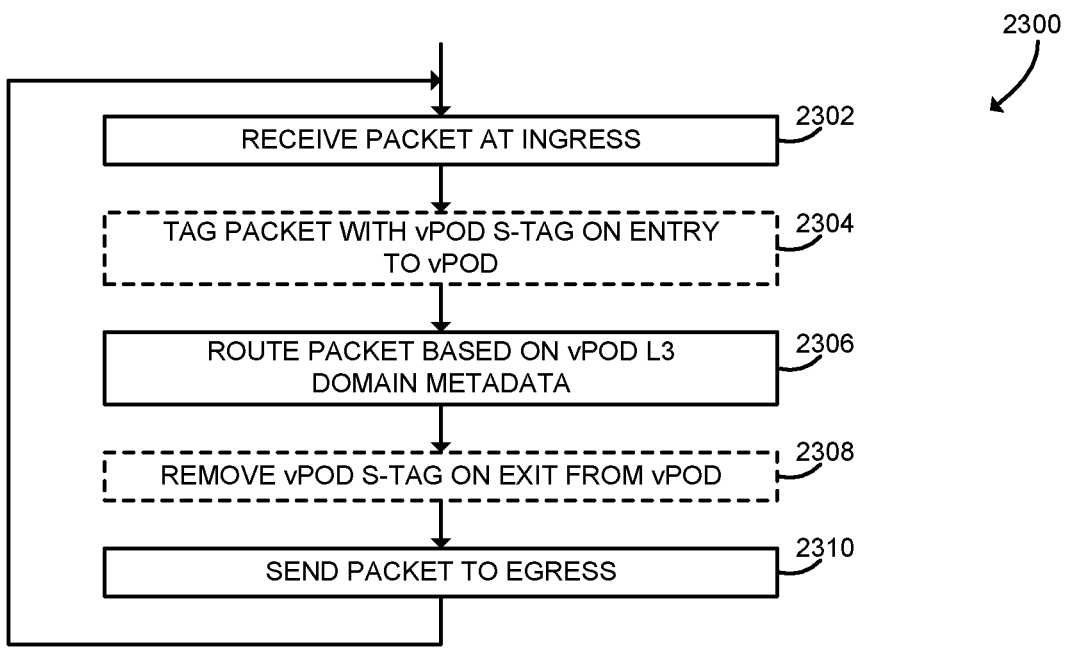
FIG. 23 is a simplified flow diagram of at least one embodiment of a method for vPOD packet routing that may be executed by a network device of FIGS. 16-17.

Referring now to FIG. 23, in use, the network device 1704 may execute a method 2300 for vPOD packet routing. It should be appreciated that, in some embodiments, the operations of the method 2300 may be performed by one or more components of the environment 1740 of the network device 1704 as shown in FIG. 17. The method 2300 begins in block 2302, in which the network device 1704 receives a network packet (ingress).

In block 2304, in some embodiments the network device 1704 may tag the packet with a vPOD 1610 S-tag on entry to the vPOD 1610. The original packet may be VLAN-tagged or untagged. For example, the original packet may be a frame with a standard FLAN tag, a packet with VxLAN or other tunnel headers, or a non-tagged packet. The inserted S-TAG may include Tag ID 0x88A8.

In block 2306, the network device 1704 routes the packet based on vPOD L3 domain metadata. The network device 1704 ingress pipeline may be enhanced to use L3 routing using a vPOD service VLAN tag (S-TAG). The fabric manager 1702 assigns 802.1 s-tags for network segments and extend the switch ingress and egress processing pipeline to include an additional L2 domain (as showcased in the metadata). The network device 1704 may, for example, compare the vPOD L3 domain metadata of the packet or other metadata of the packet to vPOD L3 domain tags configured in one or more tables of the network device 1704. This may be implemented in both the switch and NIC. In the switch and NIC ingress pipeline, the metadata may include domain ID tags for vPODs 1610. For example, the metadata may include a vPOD L3 domain of 4 bits. In addition, if a sled is shared by 2 vPODs 1610, the NIC and storage service mapping may be created with SDN tables and managed via a NIC flattened virtual Ethernet bridge (VEB) mode.

In block 2308, in some embodiments the network device 1704 may remove the vPOD 1610 S-tag on exit from the vPOD 1610. In block 2310 the network device 1704 sends the packet to egress. For example, the network device 1704 may send the packet to an appropriate port, queue, or other destination. After sending the packet, the method 2300 loops back to block 2302 to continue processing packets.

EXAMPLES

Illustrative examples of the technologies disclosed herein are provided below. An embodiment of the technologies may include any one or more, and any combination of, the examples described below.

Example 1 includes a network device for network discovery, the network device comprising: a network controller; a management controller; a management interface to (i) request, by the network controller, platform information from the management controller and (ii) receive, by the network controller, the platform information via a sideband interface with the management controller; and an enhanced discovery protocol to broadcast, by the network controller, a discovery message on a link layer network, wherein the discovery message is indicative of the platform information.

Example 2 includes the subject matter of Example 1, and wherein the platform information comprises processor capability information, processor quality of service feature information, or network controller information.

Example 3 includes the subject matter of any of Examples 1 and 2, and wherein the discovery message comprises a first enhanced TLV structure of a link layer discovery protocol frame, wherein the enhanced TLV structure is indicative of the platform information.

Example 4 includes the subject matter of any of Examples 1-3, and wherein: the management interface is further to (i) request, by the network controller, host information from an operating system of the network device, wherein the host information is indicative of a vPOD that includes the network device, wherein the vPOD comprises an application network, and (ii) receive, by the network controller, the host information; and the enhanced discovery protocol is further to broadcast, by the network controller, a second discovery message on the link layer network, wherein the second discovery message is indicative of the host information.

Example 5 includes the subject matter of any of Examples 1-4, and wherein the second discovery message comprises a network segment TLV structure of a link layer discovery protocol frame, wherein the network segment TLV structure is indicative of the host information.

Example 6 includes the subject matter of any of Examples 1-5, and wherein to receive the host information comprises to receive the host information via the sideband interface or via a USB host interface.

Example 7 includes the subject matter of any of Examples 1-6, and wherein the network device comprises a switch, and wherein the management controller comprises a switch management controller.

Example 8 includes the subject matter of any of Examples 1-7, and wherein the network device comprises a sled, and wherein the management controller comprises a board management controller.

Example 9 a network device for network routing, the network device comprising: a management interface to receive an out-of-band configuration command from a fabric manager, wherein the out-of-band configuration command is indicative of a first tag associated with a vPOD, wherein the vPOD comprises an application network; and vPOD routing support to (i) receive a packet in response to receipt of the out-of-band configuration command, (ii) compare vPOD L3 domain metadata of the packet to the first tag associated with the vPOD in response to receipt of the packet, and (iii) route the packet in response to a comparison of the vPOD L3 domain metadata of the packet to the first tag.

Example 10 includes the subject matter of Example 9, and wherein the packet comprises the first tag and a second tag, wherein the second tag comprises a VLAN tag, a Vxlan tag, or a tunnel header.

Example 11 includes the subject matter of any of Examples 9 and 10, and wherein the vPOD routing support is further to isolate network traffic based on the vPOD L3 domain metadata associated with each packet of the network traffic.

Example 12 includes the subject matter of any of Examples 9-11, and wherein the vPOD routing support is further to: insert the first tag into the packet in response to receipt of the packet from outside the vPOD; and remove the first tag from the packet in response to routing of the packet to outside of the vPOD.

Example 13 includes the subject matter of any of Examples 9-12, and wherein the network device comprises a switch, and wherein the management controller comprises a switch management controller.

Example 14 includes the subject matter of any of Examples 9-13, and wherein the network device comprises a network interface controller of a sled, and wherein the management controller comprises a board management controller.

Example 15 includes a fabric manager for network management, the fabric manager comprising: a topology discovery manager to discover a network topology of a network with an enhanced link layer discovery protocol; and a vPOD manager to (i) create a vPOD in the network in response to discovery of the network topology, wherein the vPOD comprises an application network that includes a plurality of racks in the network, and wherein each rack includes a plurality of network devices, and (ii) create a tagged network domain for the vPOD in response to creation of the vPOD.

Example 16 includes the subject matter of Example 15, and wherein to discover the network topology comprises to send an out-of-band request to a pod switch of the network.

Example 17 includes the subject matter of any of Examples 15 and 16, and wherein the vPOD manager is further to expose a vPOD creation application programming interface, wherein to create the vPOD comprises to create the vPOD in response to exposition of the vPOD creation application programming interface.

Example 18 includes the subject matter of any of Examples 15-17, and wherein to create the tagged network domain comprises to send an out-of-band configuration command to each network device of the plurality of network devices of the vPOD, wherein each out-of-band configuration command is indicative of a first tag associated with the tagged network domain.

Example 19 includes the subject matter of any of Examples 15-18, and wherein the vPOD manager is further to: maintain a plurality of mappings of vPODs to S-tags; and map the vPOD to the first tag based on the plurality of mappings.

Example 20 includes the subject matter of any of Examples 15-19, and wherein each network device of the plurality of network devices comprises switch or a network interface controller of a sled.

Example 21 includes a method for network discovery, the method comprising: requesting, by a network controller of a network device, platform information from a management controller of the network device; receiving, by the network controller, the platform information via a sideband interface with the management controller; and broadcasting, by the network controller, a discovery message on a link layer network, wherein the discovery message is indicative of the platform information.

Example 22 includes the subject matter of Example 21, and wherein the platform information comprises processor capability information, processor quality of service feature information, or network controller information.

Example 23 includes the subject matter of any of Examples 21 and 22, and wherein the discovery message comprises a first enhanced TLV structure of a link layer discovery protocol frame, wherein the enhanced TLV structure is indicative of the platform information.

Example 24 includes the subject matter of any of Examples 21-23, and further comprising: requesting, by the network controller, host information from an operating system of the network device, wherein the host information is indicative of a vPOD that includes the network device, wherein the vPOD comprises an application network; receiving, by the network controller, the host information; and broadcasting, by the network controller, a second discovery message on the link layer network, wherein the second discovery message is indicative of the host information.

Example 25 includes the subject matter of any of Examples 21-24, and wherein the second discovery message comprises a network segment TLV structure of a link layer discovery protocol frame, wherein the network segment TLV structure is indicative of the host information.

Example 26 includes the subject matter of any of Examples 21-25, and wherein receiving the host information comprises receiving the host information via the sideband interface or via a USB host interface.

Example 27 includes the subject matter of any of Examples 21-26, and wherein the network device comprises a switch, and wherein the management controller comprises a switch management controller.

Example 28 includes the subject matter of any of Examples 21-27, and wherein the network device comprises a sled, and wherein the management controller comprises a board management controller.

Example 29 includes a method for network routing, the method comprising: receiving, by a network device, an out-of-band configuration command from a fabric manager, wherein the out-of-band configuration command is indicative of a first tag associated with a vPOD, wherein the vPOD comprises an application network; receiving, by the network device, a packet in response to receiving the out-of-band configuration command; comparing, by the network device, vPOD L3 domain metadata of the packet to the first tag associated with the vPOD in response to receiving the packet; and routing, by the network device, the packet in response to comparing the vPOD L3 domain metadata of the packet to the first tag.

Example 30 includes the subject matter of Example 29, and wherein the packet comprises the first tag and a second tag, wherein the second tag comprises a VLAN tag, a Vxlan tag, or a tunnel header.

Example 31 includes the subject matter of any of Examples 29 and 20, and further comprising isolating, by the network device, network traffic based on the vPOD L3 domain metadata associated with each packet of the network traffic.

Example 32 includes the subject matter of any of Examples 29-31, and further comprising: inserting, by the network device, the first tag into the packet in response to receiving the packet from outside the vPOD; and removing, by the network device, the first tag from the packet in response to routing the packet to outside of the vPOD.

Example 33 includes the subject matter of any of Examples 29-32, and wherein the network device comprises a switch, and wherein the management controller comprises a switch management controller.

Example 34 includes the subject matter of any of Examples 29-33, and wherein the network device comprises a network interface controller of a sled, and wherein the management controller comprises a board management controller.

Example 35 includes a method for network management, the method comprising: discovering, by a fabric manager, a network topology of a network with an enhanced link layer discovery protocol; creating, by the fabric manager, a vPOD in the network in response to discovering the network topology, wherein the vPOD comprises an application network that includes a plurality of racks in the network, and wherein each rack includes a plurality of network devices; and creating, by the fabric manager, a tagged network domain for the vPOD in response to creating the vPOD.

Example 36 includes the subject matter of Example 35, and wherein discovering the network topology comprises sending an out-of-band request to a pod switch of the network.

Example 37 includes the subject matter of any of Examples 35 and 36, and further comprising exposing, by the fabric manager, a vPOD creation application programming interface, wherein creating the vPOD comprises creating the vPOD in response to exposing the vPOD creation application programming interface.

Example 38 includes the subject matter of any of Examples 35-37, and wherein creating the tagged network domain comprises sending an out-of-band configuration command to each network device of the plurality of network devices of the vPOD, wherein each out-of-band configuration command is indicative of a first tag associated with the tagged network domain.

Example 39 includes the subject matter of any of Examples 35-38, and further comprising: maintaining, by the fabric manager, a plurality of mappings of vPODs to S-tags; and mapping, by the fabric manager, the vPOD to the first tag based on the plurality of mappings.

Example 40 includes the subject matter of any of Examples 35-39, and wherein each network device of the plurality of network devices comprises switch or a network interface controller of a sled.

Example 41 includes a computing device comprising: a processor; and a memory having stored therein a plurality of instructions that when executed by the processor cause the computing device to perform the method of any of Examples 21-40.

Example 42 includes one or more non-transitory, computer readable storage media comprising a plurality of instructions stored thereon that in response to being executed result in a computing device performing the method of any of Examples 21-40.

Example 43 includes a computing device comprising means for performing the method of any of Examples 21-40.

The invention claimed is:

1. A network device for network discovery, the network device comprising:
   management interface circuitry to request platform information from a management controller, receive the platform information via a sideband interface with the management controller and
   to use a discovery protocol to broadcast a discovery message on a link layer network, wherein the discovery message includes the platform information.

2. The network device of claim 1, wherein the platform information comprises processor capability information, processor quality of service feature information, or network controller information.

3. The network device of claim 1, wherein the discovery message comprises an enhanced TLV structure of a link layer discovery protocol frame, wherein the enhanced TLV structure includes the platform information.

4. The network device of claim 1, wherein:
   the management interface circuitry is further to (i) request, host information from an operating system of the network device, wherein the host information includes a vPOD that includes the network device, wherein the vPOD comprises an application network, and (ii) receive, the host information and
   to use the discovery protocol to broadcast a second discovery message on the link layer network, wherein the second discovery message includes the host information.

5. The network device of claim 4, wherein the second discovery message comprises a network segment TLV structure of a link layer discovery protocol frame, wherein the network segment TLV structure includes the host information.

6. The network device of claim 4, wherein to receive the host information comprises to receive the host information via the sideband interface or via a USB host interface.

7. The network device of claim 1, wherein:
   the network device comprises a switch, and wherein the management controller comprises a switch management controller; or
   the network device comprises a sled, and wherein the management controller comprises a board management controller.

8. A method for network discovery, the method comprising:
   requesting, by management interface circuitry of a network device, platform information from a management controller;
   receiving, by the management interface circuitry, the platform information via a sideband interface with the management controller; and
   broadcasting, by the management interface circuitry, a discovery message on a link layer network, wherein the discovery message includes the platform information.

9. The method of claim 8, wherein the platform information comprises processor capability information, processor quality of service feature information, or network controller information.

10. The method of claim 8, wherein the discovery message comprises an enhanced TLV structure of a link layer discovery protocol frame, wherein the enhanced TLV structure includes the platform information.

11. The method of claim 8, further comprising:
- requesting, by the management interface circuitry, host information from an operating system of the network device, wherein the host information includes a vPOD that includes the network device, wherein the vPOD comprises an application network;
- receiving, by the management interface circuitry, the host information; and
- broadcasting, by the management interface circuitry, a second discovery message on the link layer network, wherein the second discovery message includes the host information.

12. The method of claim 11, wherein the second discovery message comprises a network segment TLV structure of a link layer discovery protocol frame, wherein the network segment TLV structure includes the host information.

13. The method of claim 11, wherein receiving the host information comprises receiving the host information via the sideband interface or via a USB host interface.

14. The method of claim 8, wherein:
- the network device comprises a switch, and wherein the management controller comprises a switch management controller; or
- the network device comprises a sled, and wherein the management controller comprises a board management controller.

15. One or more non-transitory, computer-readable storage media comprising a plurality of instructions stored thereon that, when executed, cause a network device to:
- request, by management interface circuitry of the network device, platform information from a management controller;
- receive, by the management interface circuitry, the platform information via a sideband interface with the management controller; and
- broadcast, by the management interface circuitry, a discovery message on a link layer network, wherein the discovery message includes the platform information.

16. The one or more non-transitory, computer-readable storage media of claim 15, wherein the platform information comprises processor capability information, processor quality of service feature information, or network controller information.

17. The one or more non-transitory, computer-readable storage media of claim 15, wherein the discovery message comprises an enhanced TLV structure of a link layer discovery protocol frame, wherein the enhanced TLV structure includes the platform information.

18. The one or more non-transitory, computer-readable storage media of claim 15, wherein the plurality of instructions, when executed, further cause the network device to:
- request, by the management interface circuitry, host information from an operating system of the network device, wherein the host information includes a vPOD that includes the network device, wherein the vPOD comprises an application network;
- receive, by the management interface circuitry, the host information; and
- broadcast, by the management interface circuitry, a second discovery message on the link layer network, wherein the second discovery message includes the host information.

19. The one or more non-transitory, computer-readable storage media of claim 18, wherein the second discovery message comprises a network segment TLV structure of a link layer discovery protocol frame, wherein the network segment TLV structure includes the host information.

20. The one or more non-transitory, computer-readable storage media of claim 18, wherein to receive the host information comprises to receive the host information via the sideband interface or via a USB host interface.

21. The one or more non-transitory, computer-readable storage media of claim 15, wherein:
- the network device comprises a switch, and wherein the management controller comprises a switch management controller; or
- the network device comprises a sled, and wherein the management controller comprises a board management controller.

* * * * *